(12) United States Patent
Fynaardt et al.

(10) Patent No.: US 10,805,313 B2
(45) Date of Patent: *Oct. 13, 2020

(54) SYSTEMS, METHODS, AND DEVICES FOR PROVISIONING AND PROCESSING GEOLOCATION INFORMATION FOR V2X DEVICES

(71) Applicant: INTEGRITY Security Services LLC, Santa Barbara, CA (US)

(72) Inventors: Daniel R. Fynaardt, Capistrano Beach, CA (US); William L. Lattin, Los Altos, CA (US); Alan T. Meyer, Anaheim Hills, CA (US)

(73) Assignee: INTEGRITY SECURITY SERVICES LLP, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,410

(22) Filed: Apr. 21, 2020

(65) Prior Publication Data

US 2020/0252409 A1    Aug. 6, 2020

Related U.S. Application Data

(63) Continuation of application No. 16/277,982, filed on Feb. 15, 2019, now Pat. No. 10,645,094, which is a
(Continued)

(51) Int. Cl.
*H04L 29/06* (2006.01)
*H04W 12/08* (2009.01)
(Continued)

(52) U.S. Cl.
CPC ........ *H04L 63/123* (2013.01); *H04L 63/0823* (2013.01); *H04L 63/102* (2013.01);
(Continued)

(58) Field of Classification Search
CPC . H04L 63/123; H04L 63/0823; H04L 63/102; H04W 4/44; H04W 4/029; H04W 12/0023; H04W 12/06; H04W 12/08
See application file for complete search history.

(56) References Cited

U.S. PATENT DOCUMENTS

8,010,786 B1    8/2011  Ward
9,038,158 B1    5/2015  MacKay
(Continued)

FOREIGN PATENT DOCUMENTS

KR    10-2018-0012658 A    2/2018
WO    2017/161570 A1    9/2017
(Continued)

OTHER PUBLICATIONS

A. Makarov, M. Španović and V. Lukić, "Authenticating vehicles and drivers in motion based on computer vision and RFID tags," 2012 IEEE 10th Jubilee International Symposium on Intelligent Systems and Informatics, Subotica, 2012, pp. 419-424, doi: 10.1109/SISY.2012.6339556. (Year: 2012).*

(Continued)

*Primary Examiner* — Jung W Kim
*Assistant Examiner* — Sameera Wickramasuriya
(74) *Attorney, Agent, or Firm* — MH2 Technology Law Group LLP

(57) ABSTRACT

Systems, methods, and devices for securely provisioning a roadside unit (RSU) that includes an application certificate, wherein the RSU is geographically restricted according to the application certificate. An enhanced SCMS system may receive a request for an application certificate for the RSU; determine, in response to the request, an operating geolocation for the RSU; verify that the operating geolocation is within the allowed geo-region for the RSU; generate an application certificate that includes the operating geoloca-
(Continued)

tion; and provide the application certificate to the RSU device. Also provided is an application certificate that includes precise operating geolocation information, an improved application certificate provisioning request that allows the requestor to specify a precise operating geolocation, new processes for generating and providing improved application certificates having geographic-restriction information, an enhanced SCMS that performs the processes, and improved computerized devices, such as RSUs, that employ the precise, operating geolocation information from the application certificates.

23 Claims, 15 Drawing Sheets

Related U.S. Application Data continuation-in-part of application No. 16/191,030, filed on Nov. 14, 2018, now Pat. No. 10,476,679.

(60) Provisional application No. 62/631,593, filed on Feb. 16, 2018.

(51) Int. Cl.
  *H04W 4/44* (2018.01)
  *H04W 12/06* (2009.01)
  *H04W 4/029* (2018.01)
  *H04W 12/00* (2009.01)

(52) U.S. Cl.
  CPC ............ *H04W 4/029* (2018.02); *H04W 4/44* (2018.02); *H04W 12/0023* (2019.01); *H04W 12/06* (2013.01); *H04W 12/08* (2013.01)

(56) References Cited

U.S. PATENT DOCUMENTS

| | | | |
|---|---|---|---|
| 9,135,820 B2 | 9/2015 | Ando | |
| 9,473,511 B1 | 10/2016 | Arunkumar | |
| 9,742,569 B2 * | 8/2017 | van Roermund | ..... H04L 9/3268 |
| 9,954,851 B2 * | 4/2018 | Ahn | ..... H04L 63/0823 |
| 10,154,061 B1 | 12/2018 | Schetina | |
| 10,250,383 B1 * | 4/2019 | Kumar | ............ H04W 12/04033 |
| 10,645,094 B2 * | 5/2020 | Fynaardt | ............... H04L 63/123 |
| 2007/0223702 A1 | 9/2007 | Tengler | |
| 2009/0235071 A1 | 9/2009 | Bellur | |
| 2011/0083011 A1 | 4/2011 | DiCrescenzo | |
| 2011/0306353 A1 | 12/2011 | Kim | |
| 2012/0179907 A1 | 7/2012 | Byrd | |
| 2012/0282895 A1 | 11/2012 | Bai | |
| 2013/0067220 A1 | 3/2013 | Ando | |
| 2016/0088026 A1 | 3/2016 | Mohamad et al. | |
| 2016/0105539 A1 | 4/2016 | Maddox et al. | |
| 2016/0112201 A1 | 4/2016 | Misawa | |
| 2016/0249176 A1 | 8/2016 | Pearce | |
| 2017/0041148 A1 * | 2/2017 | Pearce | ................ G01S 19/215 |
| 2017/0206238 A1 * | 7/2017 | Coutinho | .............. G06F 16/215 |
| 2017/0222990 A1 * | 8/2017 | Romansky | .............. H04L 67/12 |
| 2017/0366616 A1 * | 12/2017 | Rodrigues | ............... H04W 4/44 |
| 2018/0004933 A1 | 1/2018 | Nathanson | |
| 2018/0167790 A1 * | 6/2018 | Cavalcanti | ........... H04W 88/04 |
| 2018/0316511 A1 * | 11/2018 | Meyer | ............... H04W 12/0023 |
| 2019/0037362 A1 * | 1/2019 | Nogueira-Nine | ..... G01S 5/0027 |
| 2019/0116048 A1 | 4/2019 | Chen et al. | |

FOREIGN PATENT DOCUMENTS

| | | |
|---|---|---|
| WO | 2017/192161 A1 | 11/2017 |
| WO | 2018/031458 A1 | 2/2018 |

OTHER PUBLICATIONS

Shane Thomas (Authorized Officer), International Search Report and Written Opinion dated Apr. 29, 2019, PCT Application No. PCT/US2019/018355, pp. 1-13.
Notice of Allowance dated Jul. 3, 2019, U.S. Appl. No. 16/191,030, pp. 1-9.
T. Weil, "VPKI Hits the Highway: Secure Communication for the Connected Vehicle Program", in IT Professional, vol. 19, No. 1, pp. 59-63, Jan.-Feb. 2017.
Transcore Its, "DSRC Roadside Unit (RSU) Procurement Specification", Version 1.9, Aug. 2017, Prepared for New York City Department of Transportation, Prepared by TransCore ITS (Year:2017).
H. Seo et al., "LTE evolution for vehicle-to-everything services", in IEEE Communications Magazine, vol. 54, No. 6, pp. 22-28, Jun. 2016.
Julien Freudiger et al. "Mix-zones for location privacy in vehicular networks", ACM Workshop on Wireless Networking for Intelligent Transportation Systems (WiN-ITS), No. CONF. 2007.

* cited by examiner

SYSTEMS, METHODS, AND DEVICES FOR PROVISIONING AND PROCESSING GEOLOCATION INFORMATION FOR V2X DEVICES

CROSS-REFERENCE TO RELATED APPLICATIONS

This application is a Continuation of U.S. application Ser. No. 16/277,982 filed on 15 Feb. 2019 (now allowed), which claims the benefit of U.S. Provisional Application No. 62/631,593 filed on 16 Feb. 2018, and this application is a continuation in part of U.S. application Ser. No. 16/191,030 filed on 14 Nov. 2018; both of which are hereby incorporated by reference in their entireties.

FIELD OF THE INVENTION

This invention relates to systems, devices, and methods for securely generating and providing certain types of digital assets such as security credentials and digital certificates. More particularly, the invention relates to improved systems, methods and techniques for securely provisioning geolocation-specific digital assets to computerized devices of the V2X infrastructure.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of Things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" needs to be uniquely identifiable through its embedded computing system, and be able to inter-operate within the existing Internet infrastructure or by using other communications media.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, roadside units, and the like) contain at least one, and often many, embedded processors or embedded computer systems, and are computer-controlled in at least some aspects.

These computer-controlled elements of the transportation network typically communicate with each other, passing various types of information back and forth. For instance, a roadside Unit (RSU) is a computerized device located on the roadside that communicates with passing vehicles and other RSUs. An RSU may be fixed at one location, (e.g., in a box embedded beside a highway) or it may be a mobile, portable device that is carded and deployed as needed by a roadwork crew, emergency worker, or the like. The various computer-controlled elements of the transportation network may react, respond, change their operation, or otherwise depend upon the information received/sent from/to other vehicles in Vehicle-to-Vehicle (V2V; also known as Car-to-Car (C2C)) communications and/or from/to infrastructure elements, (such as RSUs) in Vehicle-to-Infrastructure (V2I; also known as Car-to-Infrastructure (C2I)) communications for safe, correct, efficient, and reliable operation. In general, the passing of information from a vehicle to any entity that may affect the vehicle (e.g., other vehicles (V2V) and infrastructure elements (V2I)), and vice versa, is referred to as Vehicle-to-everything (V2X) or Car-to-everything (C2X). Some primary goals of V2X are road safety, traffic efficiency, and energy savings.

The computers in computerized devices operate according to their software and/or firmware and data. In order to ensure safe and proper operation, the computerized devices must be properly initialized and updated (e.g., provisioned) with the proper software, firmware, executable instructions, digital certificates (e.g., public key certificates), cryptographic keys and the like (hereinafter collectively referred to as "digital assets" or "software") as intended by the manufacturer or V2X system operator, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

Particular problems arise in provisioning computerized devices that are designed to operate under geographic restrictions, such as RSUs in the V2X infrastructure, which do not function properly if the geolocation-specific digital assets provided to an RSU are not appropriate and/or up-to-date and/or do not correspond to the actual geographical operating location of that RSU.

Accordingly, it is desirable to provide improved systems, methods and techniques for provisioning geolocation-specific digital assets to computerized devices, such as RSUs of the V2X infrastructure.

SUMMARY

Described herein are systems, methods, and devices for securely provisioning a computerized device, such as a roadside unit (RSU) device, that includes an enrollment certificate and an application certificate, wherein the computerized device (e.g., RSU) is geographically restricted in its proper operation according to geographic information in both the enrollment certificate and the application certificate. Various disclosed embodiments may be implemented by an enhanced security credential management system (SCMS), which may be hosted by one or more computing systems, such as one or more server computers. In various embodiments, the systems and devices may perform, and the methods may include, operations that include: providing an enrollment certificate to the computerized device (e.g.

RSU), wherein the enrollment certificate specifies a geo-region for the computerized device (e.g. RSU); and receiving a request for an application certificate for the computerized device (e.g. RSU). In response to the request for an application certificate, the operations may further include determining an operating geolocation for the computerized device (e.g. RSU); verifying that the operating geolocation is within the geo-region; generating an application certificate that includes the operating geolocation; and providing the application certificate that includes the operating geolocation to the computerized device (e.g. RSU). In various embodiments, the proper operation of the computerized device is geographically restricted according to the operating geolocation of the application certificate.

In various implementations, the request includes the operating geolocation for the computerized device (e.g., RSU); and the operation for determining, in response to the request, an operating geolocation for the computerized device comprises obtaining the operating geolocation from the request. In further implementations, the request is received from the computerized device. In yet other implementations, the computerized device may be configured with the operating geolocation, and the computerized device includes the operating geolocation in the request.

In further various implementations, the operations may further include receiving a request to store the operating geolocation for the computerized device (e.g., RSU), wherein the request includes the operating geolocation for the computerized device; and storing, in response to the request, the operating geolocation for the computerized device, (which may be performed prior to receiving the request for the application certificate); and determining, in response to the request, an operating geolocation for the computerized device may comprise obtaining the operating geolocation that was stored. In some such implementations, the request to store the operating geolocation is received from a user of the computerized device. In some implementations, the geo-region is a country or a state, and the operating geolocation.

Still further implementations described herein are systems, methods, and devices for securely provisioning a computerized device, such as a roadside unit (RSU) device, that, once provisioned, includes an application certificate that geographically restricts the computerized device's (e.g., RSU device's) area of operation.

Another further implementations include an enrollment certificate that specifies a geo-region for the computerized device (e.g. RSU), and an enhanced SCMS that receives an application certificate request for an application certificate for the computerized device (e.g. RSU) wherein the request contains a desired operating geolocation, (which may be within the geo-region); verifies that the operating geolocation is within the geo-region; generates an application certificate(s) that includes the operating geolocation; and provides, in response to the application certificate request, the application certificate(s) that includes the operating geolocation to the RSU device, whereby the RSU device is geographically restricted according to the operating geolocation of the application certificate.

BRIEF DESCRIPTION OF THE DRAWINGS

The accompanying drawings, which are incorporated in and constitute a part of this specification, illustrate implementations of the invention and together with the description, serve to explain the principles of the invention. In the figures.

DETAILED DESCRIPTION

Figure 1:
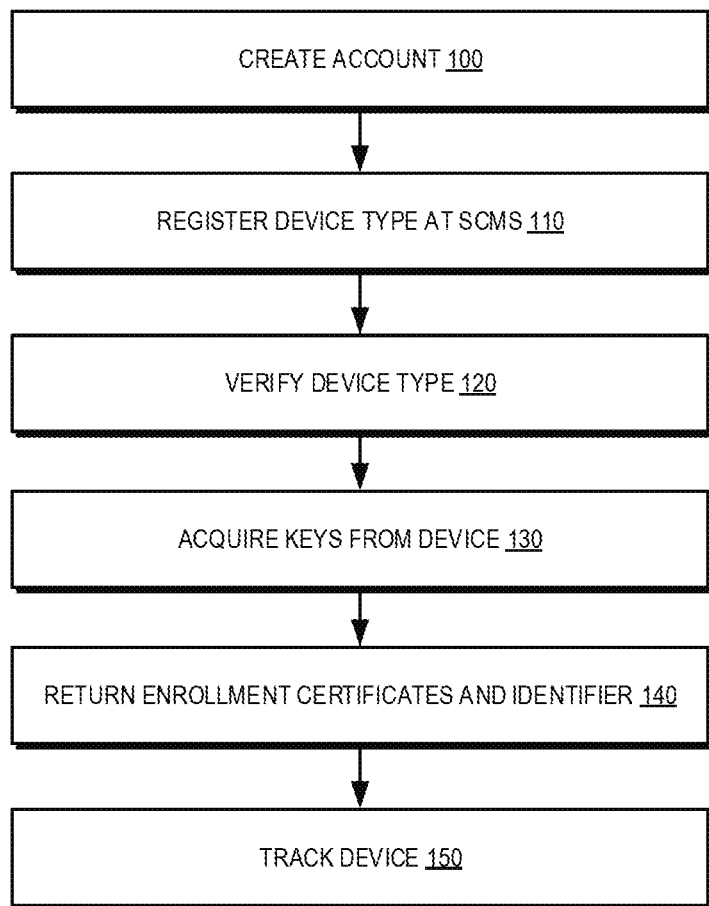
FIG. 1 is a diagram depicting an example of a method for provisioning and tracking computerized devices of entities needing certificates performed in a secure provisioning system, consistent with implementations of the invention.

Reference will now be made in detail to exemplary implementations of the invention, examples of which are illustrated in the accompanying drawings. Wherever convenient, the same reference numbers will be used throughout the drawings to refer to the same or like parts.

In various implementations, embedded computer-controlled devices can be secured by provisioning security assets within the devices. The security assets can include, for example, cryptographic keys, unique identifiers, digital certificates, and security software. Additionally, the security assets can be used for secure communications to, for example, authenticate devices and perform over-the-air programming (OTA) software updates.

In order to ensure safe and proper operation in the field, embedded devices, for instance, the Electronic Control Units (ECUs) used in vehicles, need to be properly initialized during manufacturing by provisioning digital assets, such as security assets. Digital assets could include various digital certificates, cryptographic keys, a unique identifier, and software. In most cases, an SCMS that generates these digital assets for various tenants and manufacturing factories are located in different geographical locations, which are conventionally interconnected via insecure Internet communications. It is therefore desirable to create an end-to-end secure channel from the origin of these digital assets to the devices of multiple tenants, such that the digital assets cannot be accessed or modified by malicious parties or by accident. Typically, different manufacturing factories and tenants (e.g., clients, customers, and subscribers) require different SCMS configurations. In various implementations, a tenant can be an entity such as a company or manufacturer, a client of an SCMS, or a subscriber to a SCMS. Traditionally, a separate SCMS with dedicated hardware must be configured for each tenant. Therefore, it is desirable to minimize redundancy and costs associated with using dedicated, custom-configured SCMSs to provide these digital assets to multiple tenants.

In the following description, reference will be made to security assets provisioned within Vehicle-to-Vehicle and Vehicle-to-Infrastructure (V2X) devices. V2X devices can include, for example, On Board Unit (OBUs), Electronic Control Unit (ECUs), and Roadside Units (RSUs). OBUs are included in many if not all autonomous vehicles. However, implementations described herein are not limited to V2X devices, and the disclosed principles can be applied to other types of computer-controlled devices. For example, in additional or alternative implementations, multi-tenant processes and systems can be used to provide certificates to other computerized devices, such as, for example, C2X devices. For instance, an enhanced SCMS with the CMP, virtual registration authorities, SMS, and SMS database components similar to those shown in FIG. 4 can provide certificates to one or more OBUs, ECUs, and RSUs. In various implementations, the OBUs and ECUs can be configured to be installed into vehicles, including autonomous vehicles, watercraft (e.g., boats), aircraft (e.g., airplanes and drones), spacecraft, medical devices, robots, wireless or wired communication modules, and IoT devices. Similarly, the RSUs can be installed into traffic control devices (e.g., traffic signals), roadside content distribution systems, electronic tolling systems, electronic signage devices, and digital display devices (e.g., electronic billboards).

In the V2X ecosystem, a security asset (e.g., an enrollment certificate) can be used to identify and authorize an end entity (e.g., a V2X device) to request and receive other security assets (e.g., pseudonym and/or application certificates) from a Security Credential Management System (SCMS). Unlike traditional X.509 certificates, the V2X enrollment certificates and pseudonym certificates do not carry the identity of their corresponding end entity within them; thus, an external observer cannot link their use with a particular vehicle or device. Additionally, the security assets used in the V2X devices are periodically changed during the devices' operational lives.

During manufacturing of V2X devices, the security asset provisioning process may occur at different locations (and therefore at different times), and the locations may or may not belong to different companies (e.g., third party contract manufacturers, different tenants, customers, or subscribers of an SCMS). For example, an initial security asset provisioning process may occur to facilitate manufacturing requirements, to comply with government regulation, etc. For instance, a Tier-1 manufacturer of a V2X device may provision its OBUs with enrollment certificates, and, after the units are installed in vehicles at an original equipment manufacturer (OEM), the pseudonym certificates and other data may then be provisioned to create fully operational OBUs.

The fact that the security asset provisioning process may occur at different locations can create challenges that previous systems did not have the technical capacity to address.

For example, in order to provision security assets at different locations, some systems could allow the security assets to be communicated between locations. However, this can cause time delays during manufacturing because certificates would need to be first requested and then communicated before they can be installed.

Additionally, unlike traditional X.509 certificates, V2X enrollment certificates and pseudonym certificates do not carry the identity of their corresponding end entity within them; therefore, there are additional challenges in matching the correct security assets to the correct V2X devices, particularly, when the security assets are provisioned at different locations.

Further, with traditional SCMSs, each SCMS is configured to deliver specific OBU/RSU information (e.g., configuration information) along with the correct security assets to the V2X devices. Accordingly, a traditional SCMS can only be used by one specific entity (e.g., tenant or client of the SCMS) if that entity wants to provide custom information. Thus, every entity that provides custom information would require its own customized SCMS, which can be costly and does not scale well.

As described herein, a multi-stage provisioning and multi-tenant secure provisioning system that includes a CMP, an SMS, and a SCMS with virtual registration authorities (collectively, an "enhanced SCMS") can address the technical problems described above.

An enhanced SCMS can be used by multiple entities (e.g., multiple tenants, clients, customers and subscribers), can provide unique configuration capabilities to each entity, and can provide entity-unique updates to deployed computerized devices (e.g., V2X or C2X devices). Example entities can be Tier-1 manufacturers (entities that manufacture V2X or C2X devices), OEMs (entities that provide devices to consumers and/or combine multiple V2X or C2X devices into a larger product (e.g., a vehicle)), and traffic management centers (TMC) (entities that use or manage RSUs). In various implementations, an entity can also be a combination of a Tier-1 manufacturer, an OEM, and/or a traffic management center.

According to various implementations, an enhanced SCMS has the ability to provide multi-tenant operations by, at enrollment time, linking a computerized device to a specific tenant (e.g., client, customer, subscriber) or deployment.

As described herein, an enhanced SCMS can provide multi-stage provisioning of security assets by providing enrollment certificates to V2X devices during a first stage of the provisioning via a CMP, and then performing additional stages of the provisioning after identification of the devices via the CMP.

In various implementations, the enhanced SCMS can store information for identifying devices at later stages in an SMS database, and can further associate each device with the end entity that provisions the device, as described in further detail below with reference to FIGS. 4-6. Additionally, after enrollment certificates are provisioned on a device, the device can be associated with a status indicating that it is initially provisioned.

For example, enrollment certificates can be provisioned on a device at the manufacturing stage of the device (e.g., by the Tier-1 manufacturer). At this stage, the enhanced SCMS can request a device identifier (e.g., a numeric or alphanumeric code, a serial number of the device's microprocessor, etc.), and may not provision the enrollment certificates until a device identifier is received. When the device identifier is received, the enhanced SCMS can store the device identifier that was received and associate the device identifier with the enrollment certificates that were provisioned for the device and/or with the end entity that provisioned the device.

In certain implementations, aftermarket devices can be included in the SMS database even if enrollment certificates are already provisioned on the device. As described herein, aftermarket devices can be devices that are not manufactured by a Tier-1 manufacturer and/or are manufactured by an entity that does not use the enhanced SCMS. When an aftermarket device is added to the SMS database, the aftermarket device can be associated with a status indicating that it is ready to be provisioned by the enhanced SCMS.

In some implementations, the enhanced SCMS may be able to identify a type of device and/or capabilities of the device. For example, the type of device can be determined by a device identifier and/or via communications with the end entity provisioning the security assets on the device. In various implementations, the type of device can be used to, for example, determine compatible security assets to provision, determine the number of security assets to provision, etc.

For instance, some devices may have more physical security than other devices. Devices with more physical security may be less likely to be stolen or otherwise compromised. Thus, a larger number of certificates may be provisioned on a device that is more physically secure because it is less likely that the security assets will be disclosed if the device becomes compromised. Also, a smaller number of certificates may be beneficial for less physical secure devices because when the device exhausts the provisioned security assets it can contact the enhanced SCMS to "top-off" (i.e., obtain more) security assets. If fewer security assets are provisioned then the device will top-off more often. Thus, if a device is compromised, it can be shut down, located, or otherwise attended to when it contacts the enhanced SCMS to "top-off." Accordingly, the more often the device tops-off, the more chances there are to attend to devices that are more likely to be compromised.

In some implementations, a second stage of provisioning for a V2X device can occur when pseudonym and/or application certificates are provisioned on the V2X device at the OEM (e.g., after being combined with other devices in a vehicle). At this stage, a device identifier can be received from the V2X device, and an enhanced SCMS can use the device identifier to identify the V2X device and then provision the pseudonym and application certificates based on the device that is identified (e.g., based on the enrollment certificates that were previously provisioned, based on a level of physical security for the device, etc.). In some implementations, in addition to the device identifier, an enhanced SCMS can also retrieve other data from a third party, such as test data indicating that the device was properly installed. Based on the device identifier and confirmation of correct installation, the enhanced SCMS can then provision the pseudonym and/or application certificates.

As additionally described herein, an enhanced SCMS can provide multi-tenant operations by providing an SMS (alternatively, an entity management system) for tenants (e.g., end entities) and by managing local policy files (LPFs) containing information unique to each end entity within a V2X ecosystem. For example, customized workflows can be created and customized configurations can be managed by the end entities via the subscriber management system (SMS, also referred to herein as an entity management system). The SMS is operable to manage tenants and information related to the tenants, some of which may be sent to the tenant's OBUs, RSUs, and TMC devices (TMCD).

In certain implementations, configuration information for each tenant of a plurality of tenants can be stored as elements or data fields in an LPF for that tenant. That is, an LPF stores tenant-specific data. For example, an LPF stores information related to types or classes of computerized devices associated with a tenant, but does not store information for specific end-entities or specific computerized devices that need certificates. For instance, the elements can include information such as, but not limited to, an initial provisioning amount (e.g., an amount of certificates to initially provision to the tenant's devices), cryptographic keys and certificates, linkage authorities (i.e., information identifying linkage authorities to be used by the tenant), and an indication of dedicated hardware to be used to provide a backend Quality of Service (QoS) level to the tenant. In various implementations, an initial provisioning amount indicated in an LPF for a tenant can be indicated in terms of numbers of certain types of certificates (e.g., 10,000 pseudonym certificates) or in terms of duration (e.g., a 6 month supply of certificates).

According to some implementations, an LPF for a given tenant stores one or more of a duration of validity for certificates (e.g., a certificate validity period), a number of certificates the entity is allowed to possess, an overlap time period for certificates, an amount of time certificates will be valid for in the future (e.g., for initial provisioning, how far in the future certificates will be valid), and an indication of when the tenant will need to request a certificate top-off (e.g., how far into using certificates the end-entity will wait before requesting additional certificates).

The customized workflows and customized configurations can be used to customize LPFs, and the LPFs can be transmitted to the V2X devices to customize the operations and/or configurations of the V2X devices. For example, a customized workflow and/or customized configuration can determine what information should be received and stored and how to provision a security asset (e.g., which registration authority to use, custom information to add to the security asset, custom quantities of security assets to provision on a device, etc.).

In various implementations, LPFs can be installed on computerized devices needing certificates, such as, for example, the V2X devices. This can allow the end entities to customize processes performed by the V2X devices and/or to provide customized interfaces for the V2X devices. For example, an LPF can instruct a V2X device to contact a specific entity's server (e.g., via a custom Uniform Resource Locator (URL)) and/or a specific SCMS. As a further example, an LPF can cause a V2X device to download limited amounts of security assets or define the lifetime of certificates downloaded by the V2X device (e.g., 1 week instead of 3 years).

In some implementations, an LPF can also include customized workflows and/or customized configurations based on a type of device that is provisioned with security assets. For example, using the entity management system, an end entity can specify the number of security assets to provision on various types of devices, the customized configuration can be stored in an LPF for the entity, and when the device requests security assets the LPF can be used to determine the number of security assets to provision.

Additional features that can be performed by an enhanced SCMS include, for example: providing a virtual registration authority that can be contacted by V2X devices; creating custom accounts for each end entity at the SCMS; creating new V2X device types at the SCMS; verifying device types as Department of Transportation (DOT) or other authorizing body approved; acquiring enrollment or other types of public keys (e.g., signature/encryption keys, Advanced Encryption Standard (AES) butterfly key expansion values, etc.); returning public keys, LPFs, and Local Certificate Chain Files (LCCFs) for aftermarket devices, returning registration authority URLs for final programming of fielded devices, tracking devices based on device identifiers, provisioning aftermarket devices, etc. In various implementations, an LCCF can be a binary encoded array of certificates that is created by a registration authority for publication to its end entity.

FIG. 1 is a diagram depicting an example of a method performed in a secure provisioning system, consistent with disclosed implementations. The example method can begin at 100 when a custom account is created for an entity at an entity management system of an enhanced SCMS. Additionally, in some implementations, for the purposes of the example described with regard to FIG. 1, the end entity can be a Tier-1 manufacturer of a V2X device.

In some implementations, the enhanced SCMS can create an account for the end entity based on receiving a request from the end entity. The request to create the account can include, for example, an identifier of the end entity, information about the end entity, a type of the end entity (e.g., a Tier-1 manufacturer), a security asset associated with the end entity, etc.

In 110, the enhanced SCMS can register a device type at a CMP of the enhanced SCMS. For example, a request to register a device type can be received from an end entity via their account or can be received from an administrator of the enhanced SCMS. In some implementations, the request to register the device type can include an identifier of the device type or a security asset associated with the device type. The enhanced SCMS can register the device type by storing the identifier of the device type in, for example, an SMS database.

In 120, the enhanced SCMS can verify whether the device type is approved by an authorizing body (e.g., the DOT). For example, the SCMS can transmit the identifier and/or security asset to a server associated with the authorizing body to request verification and/or can compare the identifier and/or security asset to a list of approved device types stored in the SMS database. The SCMS can then store an indication of whether the device type is verified, e.g., in the SMS database.

In 130, the SCMS can acquire public keys for a device (e.g., enrollment certificate public keys, signature keys, encryption keys, AES butterfly key expansion values, and the like) and acquire or generate an identifier for the device. For example, the public keys can be received from the device or an end entity can access their account via an entity management system and input the public keys and/or input the identifier. The public keys and/or identifier for the device can be stored in the SMS database.

In 140, based on the public keys acquired in 130, the enhanced SCMS can return enrollment certificates to the end entity to be provisioned on the device and/or to the device itself. In some implementations, the enhanced SCMS may also return a registration authority URL and certain configuration data for final programming into the device. For example, the registration authority URL may be unique to the end entity and/or customized by the end entity (via the entity management system). As a further example, the registration authority associated with the URL can be a virtual registration authority associated with an SCMS of the enhanced SCMS.

In various implementations, the enhanced SCMS receives public keys from the computerized device that needs certificates. For example, the enhanced SCMS may receive only an enrollment public key or the enhanced SCMS may receive the enrollment public key and other application/pseudonym public keys. The enhanced SCMS may return only an enrollment certificate (with the other data like LPF) or the enhanced SCMS may return application/pseudonym certificates as well, depending on the supplied public key(s) received from the device. In certain implementations where the computerized device is an aftermarket device, the enhanced SCMS may receive public keys for the aftermarket device, and may return public keys, an LPF, an LCCF, and other data to the aftermarket device. According to certain implementations, the download of an LPF and LCCF for a computerized device are accomplished through Representational State Transfer (REST) service calls and do not include an enrollment certificate (e.g., a signed message). For all other REST service calls, an SCMS host of the enhanced SCMS can perform a lookup to verify that a specific enrollment certificate for a device is owned by or associated with a certain tenant. That is, a cryptographic validation can be made for these service calls to ensure they are allowed. For LPF and LCCF downloads, the tenant identifier (ID) in a URL, route, HTTP header, or other mechanisms is used to determine which file to provide to the computerized device. The LCCF can be consistent for all tenants of the enhanced SCMS (i.e., all certificates included), but the LPF may be different per tenant. For other service calls, a strong cryptographic link ensures that the computerized device and certificate management is securely managed, even though a single registration authority (e.g., a virtual registration authority) or a single set of SCMS backend components is handling different policies.

In 150, the enhanced SCMS can set the state of the device to initially provisioned or to provisioned if the device is an aftermarket device (e.g., in the SMS database) and can track the device for when the device is further provisioned by an OEM or traffic management center at a subsequent stage of the provisioning, as described below with regard to FIG. 2.

Figure 2:
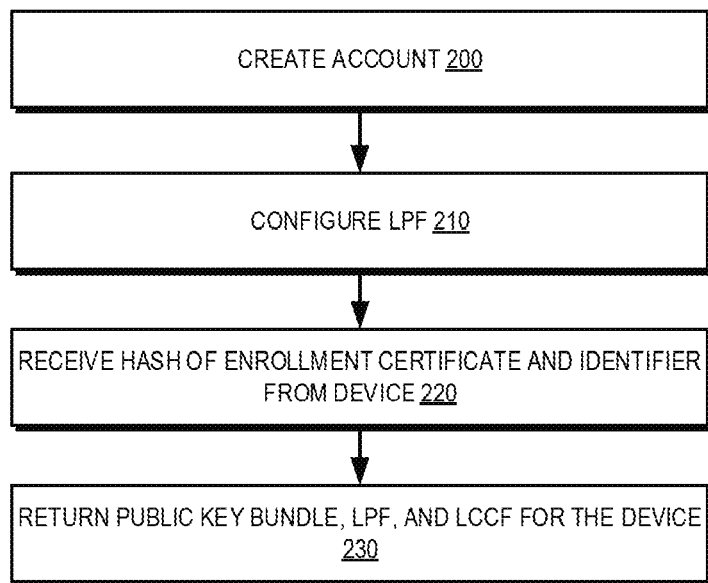
FIG. 2 is a diagram depicting an example of a method for configuring and providing a local policy file (LPF) for a computerized device performed in a secure provisioning system consistent with implementations of the invention.

FIG. 2 is a diagram depicting an example of a method performed in a secure provisioning system, consistent with disclosed implementations. The example method can begin at 200 when a custom account is created for an end entity at the enhanced SCMS. In various implementations, the custom account can be created and/or managed via an entity management system of the enhanced SCMS. Additionally, in some implementations, for the purposes of the example described with regard to FIG. 2, the entity can be an OEM or a traffic management center that operates a V2X device and/or operates a product that incorporates one or more V2X devices. In other implementations, the entity can be a Tier-1 manufacturer of the V2X device when the Tier-1 manufacturer ships partially or fully provisioned devices to OEMs. The end entity may also be the USDOT or other approval body and used to create and manage a database of approved devices that may be issued certificates.

In some implementations, the enhanced SCMS can create an account for the end entity based on receiving a request from the end entity. The request to create the account can include, for example, an identifier of the end entity, information about the end entity, a type of the end entity (e.g., an OEM or a traffic management center), a security asset associated with the end entity, etc.

In some implementations, creating an account for the end entity can include generating one or more default LPFs for the entity. For example, different default LPFs can be associated with different device types.

In 210, the enhanced SCMS can receive a request to configure an LPF. For example, the request to configure the LPF can be a request to configure a workflow for a particular device type, a request to set a URL of a registration authority, a request to change or set geographic restrictions (e.g., geographic coordinates where an RSU can operate), a request to configure a top-off policy (e.g., change a number of security assets to provision, set the types of authorized security assets, etc.), and the like. In some implementations, a top-off policy can be used to determine how to respond to a top-off request, as described with regard to FIG. 3 below. In further implementations, a top-off policy can be set based on a device type, based on application certificates associated with a device, and/or based on a location of the device.

In 220, the SCMS can receive a hash of an enrollment certificate or the hash of the initial certificate request from a V2X device via the CMP and an identifier of the V2X device. In some implementations, the hash and identifier can be received via the account created for the end entity in 200.

In some implementations, the enrollment certificate can be an enrollment certificate that was returned to the device by the enhanced SCMS in 140, described above. In other implementations, the device can be an aftermarket device, and the enrollment certificate may not have been provided by the enhanced SCMS.

In some implementations, the identifier can be an identifier that was received or generated by the enhanced SCMS in 140, described above, and the enhanced SCMS can identify the V2X device and/or a type the V2X device based on the identifier of the V2X device.

In 230, the enhanced SCMS can return a public key bundle, an LPF, and an LCCF to the device. In some implementations, the information returned to the device can be determined based on identifying the device in 220. For example, the LPF that is returned can correspond to an LPF for the device type selected and/or customized by the end entity associated with the V2X device. Based on returning the information to the V2X device, the enhanced SCMS can set a state of the device to provisioned or partially provisioned. In various implementations, a device state of provisioned indicates that the device has its enrollment certificate pseudonym/application certificates, and other files, such as, for example, an LPF and an LCCF. A device state of partially provisioned can be used to indicate that a computerized device only has some of this data. In some implementations, the enhanced SCMS may keep a count of the number of provisioned devices associated with the enhanced SCMS and/or with each end entity and may update the count based on setting the state of the device to provisioned. For example, the enhanced SCMS can use the number of provisioned devices to confirm that the number of provisioned devices does not exceed a predetermined size of a production run. Thus, the enhanced SCMS can verify that there is no unauthorized overproduction.

In 240, the enhanced SCMS can receive a request to manage a deployed device. In some implementations, the request to manage a deployed device can be a request to configure an LPF after the device is deployed. For example, the request to configure the LPF can be a request to change or set geographic restrictions, a request to change a number of security assets to provision, etc. After the LPF is updated, the enhanced SCMS can transmit the updated LPF to the appropriate device when the device next contacts the enhanced SCMS. For example, the device may contact the enhanced SCMS to request a top-off of security assets, as described with regard to FIG. 3.

Figure 3:
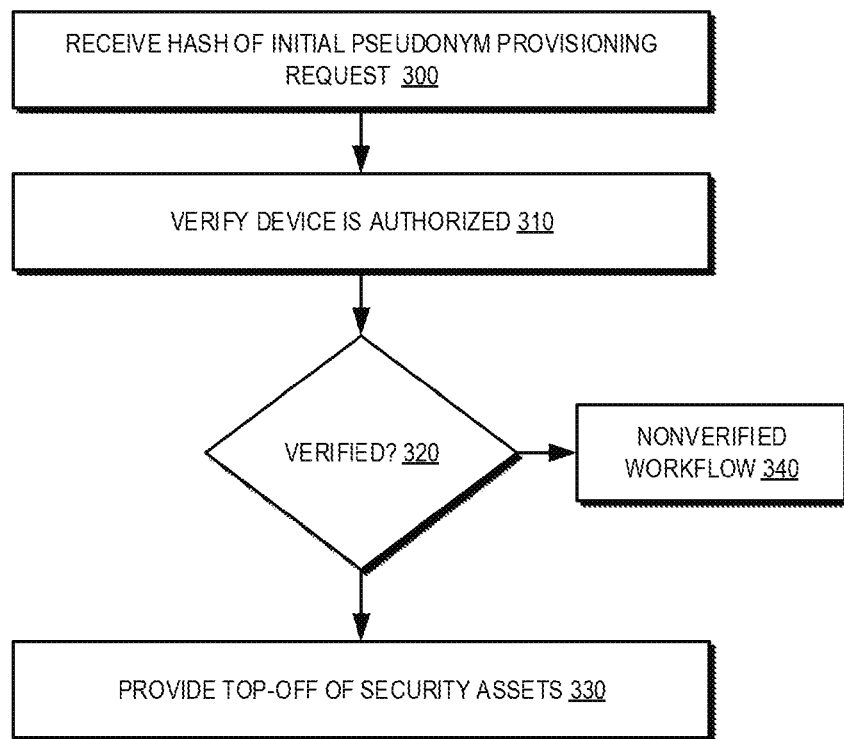
FIG. 3 is a diagram depicting an example of a method for providing a top-off of security assets to a computerized device performed in a secure provisioning system consistent with implementations of the invention.

FIG. 3 is a diagram depicting an example of a method performed in a secure provisioning system, consistent with disclosed implementations. The example method can begin at 300 when a hash of the initial pseudonym provisioning request is received at the enhanced SCMS. In various implementations, the hash of the initial pseudonym provisioning request can be received from a V2X device that was provisioned via the enhanced SCMS or from an aftermarket V2X device that was not provisioned via the enhanced SCMS.

In some implementations, the hash of the initial pseudonym provisioning request can be included as part of a request to top-off security assets at the V2X device.

In further implementations, a Content Delivery Network (see, e.g., the content delivery network 412 of FIG. 4, discussed below) can be associated with the secure provisioning system. The Content Delivery Network can include a distributed network of devices that can store and/or obtain security assets, and can allow V2X devices to top-off security assets from devices that are closer in physical proximity to the V2X devices (e.g., to reduce network latency).

In 310, the enhanced SCMS can verify whether the device is authorized. For example, the enhanced SCMS can access information associated with an account of an end entity associated with the V2X device to determine whether the device is authorized and has an active status. As shown in FIG. 3, 310 can verify that a computerized device is authorized. In 310, if a computerized device is not authorized (e.g., stolen, misbehaving, inactive, etc.) that device will be denied top off. Verification of the device being authorized in 310 ensures the security intent of proper and authorized operation of the computerized device in the ecosystem. The enhanced SCMS will not provide certificates to unauthorized devices. Devices may be unauthorized due to payment failure, compromise, a revoked status, etc.

In various implementations, the end entity may be able to change the status of V2X devices associated with the end entity between active and inactive. For example, if a V2X device is reported as stolen or otherwise compromised, the end entity may change the status of the V2X device from active to inactive.

If, in 320, the V2X device is verified as active, the enhanced SCMS can provide a top-off of security assets in 330. In some implementations, the SCMS can provide a top-off of security assets based on a top-off policy set by the end entity associated with the V2X device. For example, the end-entity may specify the number of security assets to provision on the V2X device and/or specify which type of security assets are authorized to be provisioned on the V2X device, as described above. Additionally, in some implementations, the enhanced SCMS can provide an updated LPF to the V2X device, if appropriate. In further implementations, the enhanced SCMS can instruct the V2X device to retrieve the top-off of security assets via a Content Delivery Network by determining a device that is physically closer to the V2X device, and instructing the V2X device to retrieve the top-off from that closer device.

If, in 320, the V2X device is not verified as active, the enhanced SCMS may not provide a top-off of security assets in 340, but, instead, can follow a custom non-verified workflow set by the end entity associated with the device (e.g., via a CMP). For example, the enhanced SCMS may send a shutdown request to the V2X device, may retrieve global positioning system (GPS) coordinates from the device, may provide an updated LPF to the V2X device, etc.

In some implementations, the features described herein can prevent unauthorized provisioning or incorrect provisioning of V2X devices. For instance, public safety vehicles may have unique capabilities in the V2X ecosystem to control intersection traffic signals. The above-described features can ensure that only public safety vehicles are issued certificates with these capabilities to maintain the overall correct operation of the V2X ecosystem.

In further implementations, the enhanced SCMS may provide re-enrollment functionality. In some instances, a fielded device may need to be reset to a factory "default" provision in which all the originally provisioned keys and data are erased. To re-enroll such a device, the enhanced SCMS can use a multistage process to securely re-provision this device so that re-enrollment of unauthorized devices is prevented. For example, the enhanced SCMS will establish a secure communications path to a known end location such as an OEM's service bay. Mutually authenticated Transport Layer Security could be used to establish such a secure communications path. The enhanced SCMS can then request that the device's microprocessor serial number or other permanent identifier be retrieved from the device along with a new Enrollment Key Certificate Signing Request. The enhanced SCMS can then verify that it has previously provisioned a device with this permanent identifier. If the enhanced SCMS can verify this, then the enhanced SCMS will return an enrollment certificate with other device provisioning information such as the LPF, etc. The enhanced CMS can retain a state record for the device indicating that it has been re-enrolled. The device can then use SCMS protocols to request a pseudonym/application certificate bundle. Based on the configuration settings in the enhanced SCMS, the SCMS will use its flexible provisioning mechanism to download to the device only what it is authorized to receive. This can allow the OEM and/or its service site to be queried to verify that the re-enrollment provisioning is authorized. This additional check may be performed if there is a possibly of rogue activity or if re-enrolling a high value entity (e.g., a police car that has special capabilities to control intersection signal lights).

Although an example V2X system has been used to illustrate these new capabilities, they may also be used with other IoT devices, such as, for example, the European C-ITS Car to Car (C2C) and Car to Infrastructure (C2I, C2X) system, or intelligent medical devices.

Figure 4:
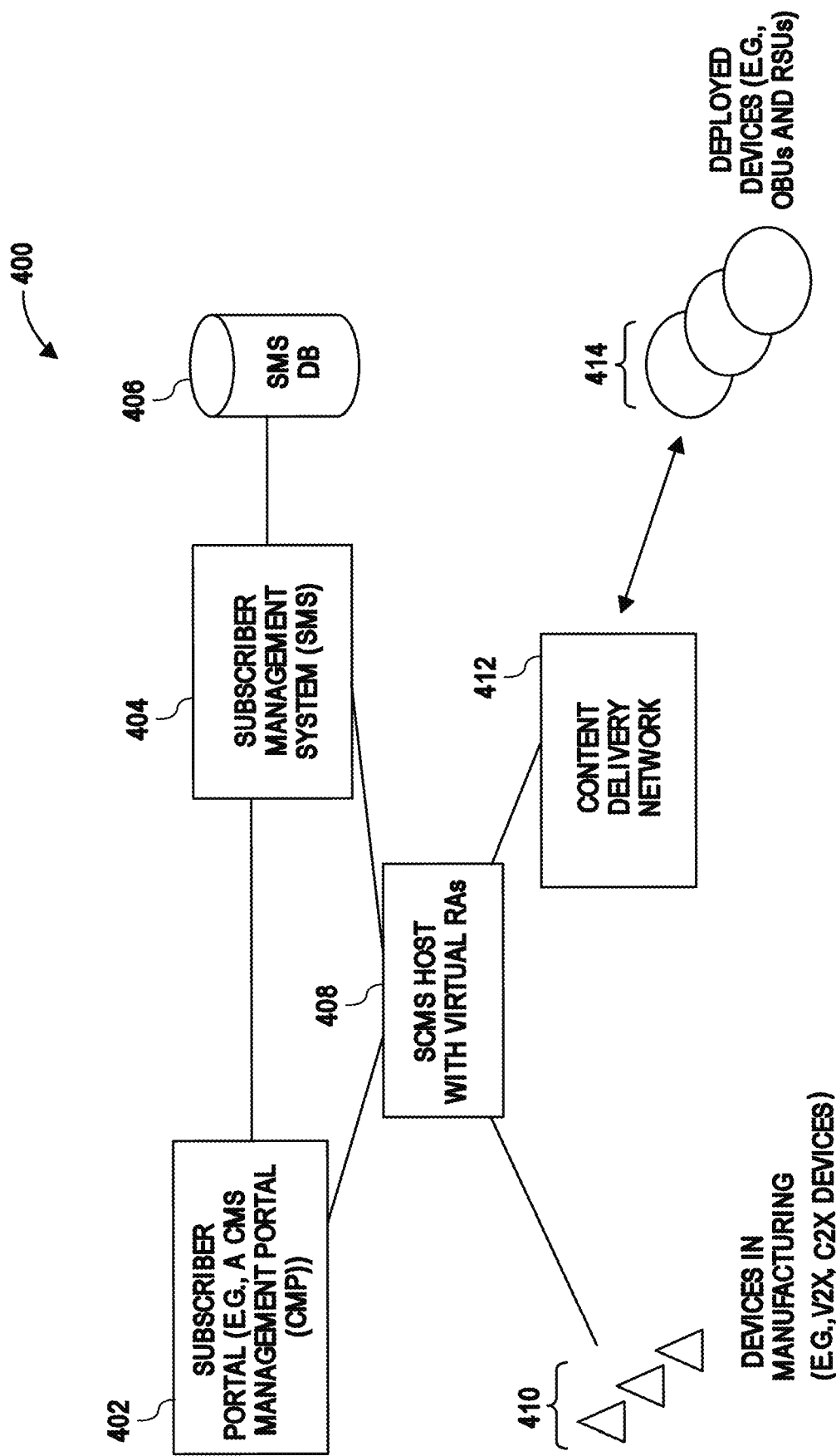
FIG. 4 is a diagram depicting an example of a secure provisioning system configured to support multi-tenant operations consistent with implementations of the invention.

FIG. 4 is a diagram depicting an example of a secure provisioning system 400, consistent with disclosed implementations. The secure provisioning system 400 can include an SCMS host 408 with virtual registration authorities, a CMS management portal (CMP) 402, a subscriber management system (SMS) 404, a SMS database 406, one or more computerized devices 410 in manufacturing, a content delivery network 412, and one or more deployed devices 414. In some implementations, the SMS 404 functions as an entity management system for managing configuration information for subscriber entities. In various implementations, the SMS 404 is operable to manage tenants and information related to the tenants, some of which may be sent to the tenant's OBUs, RSUs, and TMC devices. As shown in FIG. 4, the deployed devices 414 can include computerized devices with OBUs (e.g., vehicles with V2X or C2X devices) and/or one or more RSUs. In the example of FIG. 4, the CMP 402 can function as a subscriber portal. In certain implementations, the CMP 402 receive tenant information from a tenant (e.g., a client), and the CMP 402 then saves parameters from the tenant in an LPF. According to such implementations, a separate LPF is generated for each tenant, and the CMP 402 is used by each tenant to configure their version of the secure provisioning system 400 as they require. For example, a tenant can indicate parameters to be stored in the LPF that configure the duration of validity for certificates (e.g., a certificate validity period), a number of certificates devices of the tenant are allowed to possess, an overlap time period for the tenant's certificates, an amount of time the tenant's certificates will be valid for in the future (e.g., for initial provisioning of the tenant's devices, how far in the future certificates will be valid), and an indication of when the tenant will need to request a certificate top-off (e.g., how far into using certificates the end-entity will wait before requesting additional certificates).

With continued reference to FIG. 4, the components of the secure provisioning system 400 form an enhanced SCMS that can include the SMS 404, the SCMS host 408 with virtual registration authorities, the CMP 402, and the SMS database 406. In some implementations, each of the CMP 402, the SMS 404 (e.g., an entity management system), the SMS database 406, and the SCMS host 408 with the virtual registration authorities can be separate devices, each including one or more processors, one or more computer-readable non-transitory media, and the like. In alternative or additional implementations, two or more of the CMP 402, the SMS 404, the SMS database 406, and the SCMS host 408 with the virtual registration authorities can be combined into a single computing device. As shown in FIG. 4, components of the secure provisioning system 400 communicatively coupled to other components of the secure provisioning system 400.

In various implementations, the SCMS host 408 with virtual registration authorities may provide security assets and validate hashes of security assets as described above. In further implementations, the CMP 402 may provide interfaces for entities (e.g., tenants, subscribers, clients) and computerized devices (e.g., V2X or C2X devices) to communicate with an enhanced SCMS. For example, the CMP 402 can provide communications interfaces that a plurality of tenants and computerized devices of the plurality of tenants can use to exchange communications with the SCMS host 408. Such communications can include, for example, provisioning requests, HTTPS POST requests, request acknowledgements, request results, batch certificate downloads, and other messages. In additional or alternative implementations, SMS 404 functions as an entity management system that can store and/or manage accounts (e.g., account information) of various entities (e.g., tenants, subscribers, clients, customers) that use the enhanced SCMS. In still further implementations, the SMS database 406 may store information for the enhanced SCMS. For example, the SMS database 406 can store information for identifying computerized devices at later stages, and can further associate each computerized device with an end entity (e.g., a tenant) that provisions the computerized device.

As further depicted in FIG. 4, the devices 410 in manufacturing may represent V2X or C2X devices currently associated with a Tier-1 manufacturer (as described above), and deployed vehicles and RSUs can represent devices currently associated with an OEM and/or a traffic management center.

In the example implementation shown in FIG. 4, the content delivery network 412 can be a component of or associated with the secure provisioning system 400. The content delivery network 412 can include a distributed network of devices that can store and/or obtain security assets, and can allow the deployed devices 414 to top-off security assets from devices that are closer in physical proximity to the deployed devices 414 (e.g., to reduce network latency). For example, deployed V2X devices can top-off certificates from nearby devices by communicating via the content delivery network 412.

Figure 5:
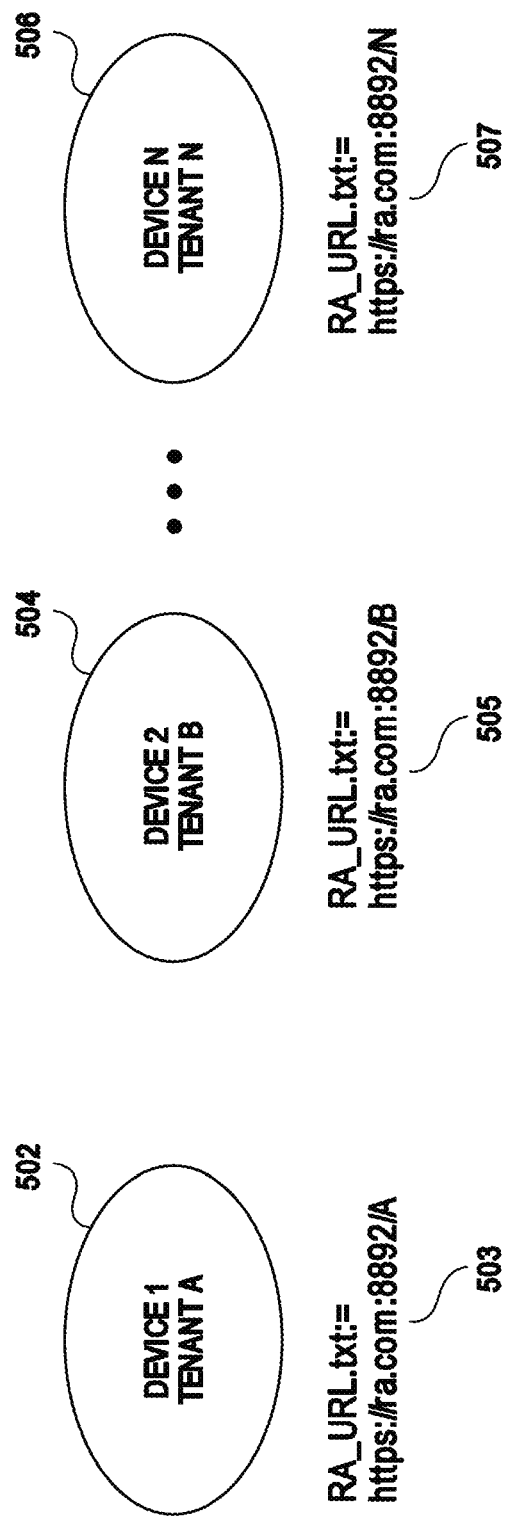
FIG. 5 is a diagram depicting computerized devices corresponding to multiple tenants of a secure provisioning system consistent with implementations of the invention.

FIG. 5 is a diagram depicting computerized devices 502, 504, 506 corresponding to multiple tenants (e.g., tenant A, tenant B, and tenant N) of a secure provisioning system consistent with implementations of the invention. According to various implementations, an enhanced SCMS has the ability to provide multi-tenant operations by, at enrollment time, linking a computerized device to a specific tenant (e.g., client, customer, and subscriber) or deployment.

In the example of FIG. 5, there is a group of n tenants, and the enhanced SCMS can link device 502 to tenant A, can link device 504 to tenant B, and can link device 506 to the last, nth tenant in the group of n tenants (i.e., tenant n). As shown in FIG. 5, such linking of devices 502, 504, 506 to their corresponding tenants can be performed by parsing a respective network address, path, or URL that the devices 502, 504, 506 use to access a registration authority in order to determine the tenant identifier (tenant ID). In the example of FIG. 5, the URL 503 includes a tenant ID of tenant A that is appended to the URL 503, the URL 505 includes a tenant ID of tenant B, and the URL 507 includes a tenant ID of tenant n. These URLs 503, 505, 507 may be used by the computerized devices 502, 504, 506 to access a registration authority of the enhanced SCMS. In alternative or additional implementations, a tenant ID for a tenant can be provided to the devices 502, 504, 506 at enrollment by including a tenant ID that is prepended or otherwise indicated the URLs 503, 505, 507. In other alternative or additional implementations, the tenant ID for a tenant can be provided to a device (e.g., device 502) in a new file at enrollment time where the device adds the tenant ID to a new HTTP header element such as, for example, an 'SCMS tenant' header element. According to various implementations, tenant information such as the tenant ID can be encrypted in a message, thus protecting the identity of a tenant associated with a given device.

Figure 6:
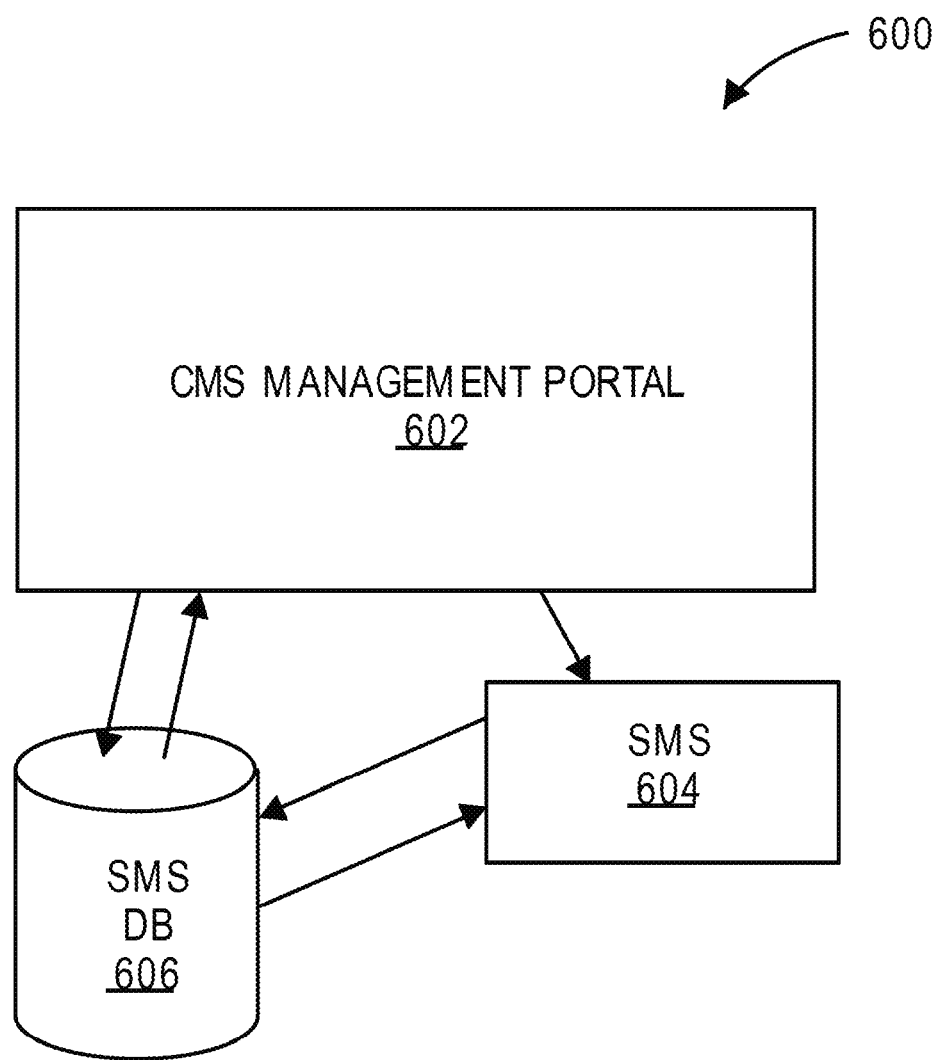
FIG. 6 is a diagram depicting an example workflow within a secure provisioning system including a certificate management system (CMS) management portal (CMP) consistent with implementations of the invention.

FIG. 6 is a diagram depicting an example workflow 600 within a secure provisioning system including a certificate management system (CMS) management portal (CMP) 602, an SMS 604, and an SMS database 606, consistent with implementations of the invention. According to various implementations, a tenant is registered via the CMP 602. Within the CMP 602, a device owner (e.g., an owner of one of the devices 502, 504, 506 discussed above with reference to FIG. 5) establishes an account registers devices, submits certifications for the devices, and is given a tenant ID by the CMP 602.

The example workflow 600 includes registering new customer information (e.g., tenant or subscriber information) with the CMP 602. The workflow 600 also includes identifying a device of the tenant, target uses for the device (e.g., intended uses of the tenant's computerized device), and the tenant providing certification documents. This information is then submitted by the tenant to the CMP 602 for approval. Upon an out-of-band approval by the CMP 602, the tenant then receives a generated tenant ID and account information. The tenant ID and that tenant's account information can be stored in the SMS database 606 and subsequently retrieved from the SMS database 606 by the CMP 602 and the SMS 604 as needed.

In FIG. 6, the CMP 602 can be operable to receive and configure SLA details for a tenant. In some implementations, the CMP 602 can also be operable to configure business requirement details for certain customization required by a tenant. For example, a tenant can indicate to the CMP 602 whether the tenant wants hardware separation for certificate generation (see, e.g., the set of isolated and independent SCMS backend components 724 of FIG. 7, described below), cryptographic separation for cryptographic computations, hardware security module (HSM) separation for sensitive computations, a unique certificate chain under a certificate authority, expected usage per week, local policy parameters (e.g., from an LPF), and other SLA details for the tenant. In the workflow 600, the CMP 602 submits these SLA details to the SMS database 606 for storage and then notifies the SMS 604 for contractual and billing services. In various implementations the SMS 604 is configured to manage tenants and information related to the tenants, some of which may be stored in the SMS database 606 and sent to the tenant's OBUs, RSUs, and TMC devices. Depending on the configuration and service level for a new tenant, backend SCMS services can be created and hardware deployed for the new tenant, depending on the tenant's needs and SLA details. For instance, as shown in FIG. 7, described below, a dedicated registration authority 721 and independent SCMS backend components 724 can be deployed for a tenant N with a higher level of service than other tenants.

Figure 7:
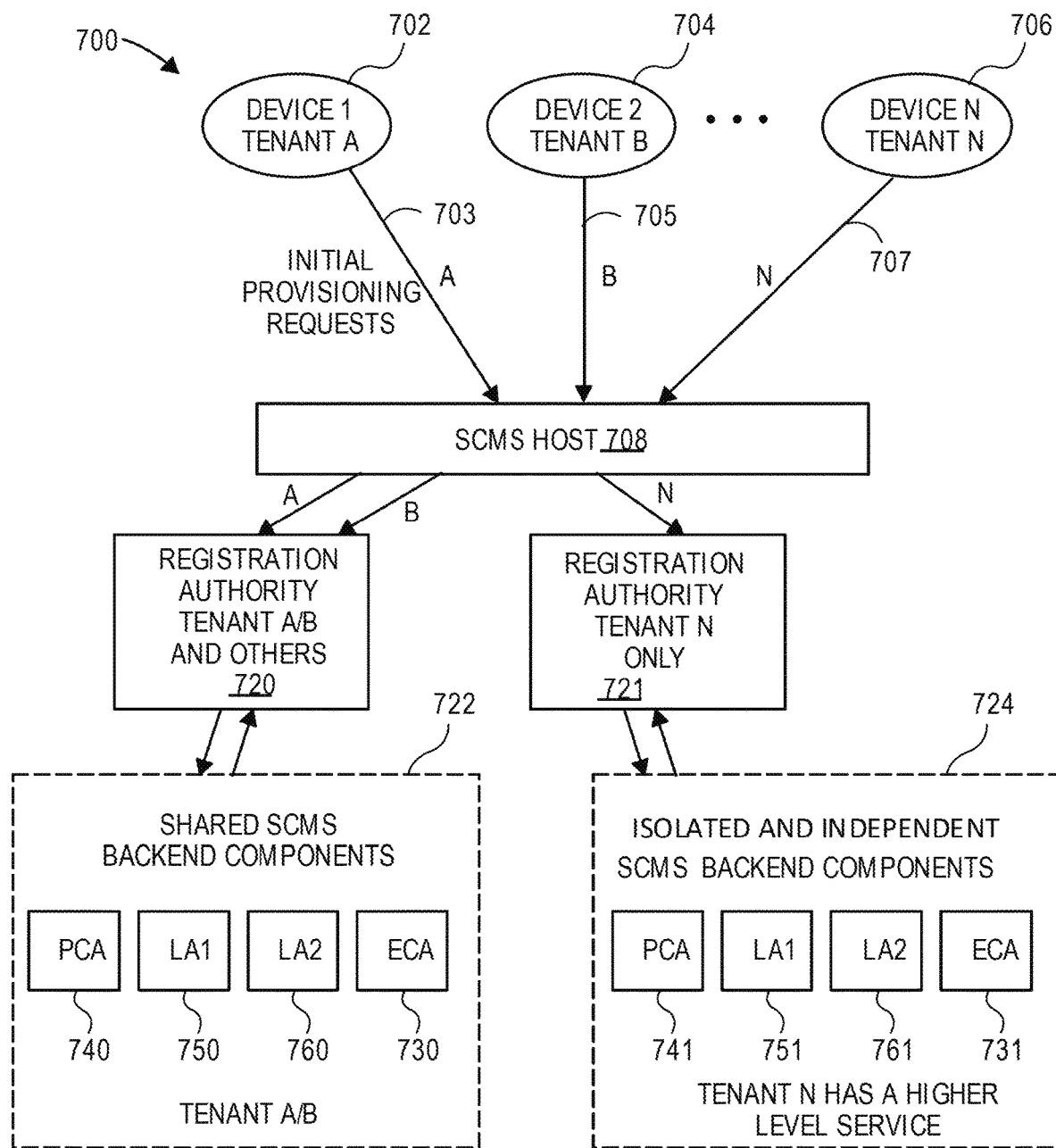
FIG. 7 is a diagram depicting an example operating environment for a secure provisioning system configured to support multi-tenant operations consistent with implementations of the invention.

FIG. 7 is a diagram depicting an example operating environment 700 for a secure provisioning system configured to support multi-tenant operations consistent with implementations of the invention. As shown, the operating environment 700 includes an SCMS host 708, computerized devices 702, 704, 706 associated with multiple tenants of a group of n tenants (e.g., tenants A, B, . . . N), registration authorities 720, 721, and sets of SCMS backend components 722, 724.

In the example operating environment 700 a single SCMS host 708 is a hardware platform with a single IP address, where the SCMS host 708 is shared amongst the tenants of the group of n tenants. That is, the SCMS host 708 handles initial provisioning requests 703, 705, 707 from computerized devices 702, 704, 706. Some tenants, based on required service levels and purchased tiers of service (e.g., as captured in service level agreements (SLAs)), may choose to share SCMS backend components. In the example of FIG. 7, tenants A and B have opted to use the shared set of SCMS backend components 722. Alternatively, other tenants that require higher tiers of service or have greater needs for quickly provisioning larger numbers of certificates, can have SLAs giving the tenants access to separate, dedicated SCMS backend components that include separate hardware components (e.g., isolated and independent hardware components dedicated to performing cryptographic operations for a single tenant). In the example of FIG. 7, tenant N has opted to use the set of isolated and independent SCMS backend components 724. In certain implementations, parameters in respective LPFs for tenants A, B, . . . N can designate use of either the shared set of SCMS backend components 722 or the set of isolated and independent SCMS backend components 724.

As shown in FIG. 7, each of a plurality of computerized devices 702, 704, 706 can submit respective initial provisioning requests 703, 705, 707 to their configured registration authority, via the SCMS host 708, where the provisioning requests 703, 705, 707 indicate a respective tenant ID. According to some implementations, the tenant IDs for tenants A, B, . . . N can be included in route information that is submitted to the SCMS host 708. That is, in the operating environment 700, each of the computerized devices 702, 704, 706 has been enrolled by a specific tenant (e.g., one of tenants A, B, . . . N) and in their respective, initial provisioning requests 703, 705, 707, the tenants provide their respective tenant IDs. In various implementations, the tenant IDs can be provided in a URL (e.g., as in the URLs 503, 505, 507 of FIG. 5), in a route, in an HTTP header element (e.g., an 'SCMS tenant' element), or by some other mechanism.

The SCMS host 708 is the single SCMS registration authority endpoint for a centralized service. The SCMS host 708 receives all requests, including the initial provisioning requests 703, 705, 707, parses out the tenant ID from the request and performs validation (e.g., to determine correct tenant for an enrollment certificate). The SCMS host 708 routes various requests to a virtual, shared registration authority 720, or a dedicated registration authority 721. In various implementations, a tenant ID is added to every message transmitted within the operating environment 700 after the SCMS host 708 parses out the tenant ID from the initial provisioning requests 703, 705, 707. In accordance with some implementations, the tenant ID may be obfuscated in such messages with a hash or by mapping the tenant ID to a universally unique identifier (UUID). This mapping of the tenant IDs to their respective UUIDs can be stored in the SMS database 606 discussed above with reference to FIG. 6. Such obfuscation helps ensure privacy for messages transmitted via the virtual registration authority 720 that is shared between multiple tenants (e.g., tenants A and B). The tenant ID is then used in the operating environment 700 to determine which keys or which certificate chain to use. The tenant ID also allows the registration authorities 720, 721 to determine what policy parameters to abide by for a particular request (e.g., one of the provisioning requests 703, 705, 707).

In the operating environment 700, the SCMS host 708 can be an abstraction or virtual layer above the registration authorities 720, 721. The SCMS host 708 parses tenant IDs from the initial provisioning requests 703, 705, 707. From the perspective of the devices 702, 704, 706 and devices external to the operating environment 700, there is one SCMS URL that all tenants (e.g., clients) use to connect to the SCMS host 708. In this way, and by using the SCMS host 708 to parse tenant IDs from the initial provisioning requests 703, 705, 707, the operating environment 700 ensures that snooping cannot be used to determine whether a particular one of the computerized devices 702, 704, 706 is owned by or associated with a specific tenant. This protects the identity and privacy of tenants from anyone who may attempt to snoop on network traffic passed to the operating environment 700.

In the operating environment 700, the SCMS host 708 can parse a tenant ID from a route, URL, HTTP header, or other mechanism used for the initial provisioning requests 703, 705, 707 and route the initial provisioning requests 703, 705, 707 to the correct registration authority (e.g., shared registration authority 720 or dedicated registration authority 721). As shown in FIG. 7, the SCMS host 708 parses tenant IDs for tenants A and B from initial provisioning requests 703 and 705, and then routes those requests to registration authority 720 based on the parsed tenant IDs. Similarly, the SCMS host 708 parses a tenant ID for tenant N from initial provisioning request 707, and then routes that request to dedicated registration authority 721 based on the parsed tenant ID for tenant N. In alternative or additional implementations, there can be a single registration authority that routes requests with an embedded tenant ID in internal messages exchanged between the SCMS host 708 and the single registration authority. In other alternative or additional implementations, there can be a completely independent, internal virtual registration authority component that fields the initial provisioning requests 703, 705, 707 and then routes the requests to the correct backend components.

In the example of FIG. 7, a set of shared SCMS backend components 722 are components that are shared between tenants A and B. The shared set of SCMS backend components 722 include a shared pseudonym certificate authority 740, a shared linkage authority 1 750, a shared linkage authority 2 760, and a shared enrollment certificate authority 730 that provide certificates and linkage values to tenants A and B. As also shown in FIG. 7, a set of isolated and independent SCMS backend components 724 are components that are dedicated to fulfilling certificate request from a single tenant, tenant N. The set of independent set of SCMS backend components 724 include an independent pseudonym certificate authority 741, an independent linkage authority 1 751, an independent linkage authority 2 761, and an independent enrollment certificate authority 731 that provide certificates and linkage values exclusively to tenant N. In the example of FIG. 7, tenant N has a higher level of service (e.g., a higher service tier or priority of service) than tenants A and B, and as a result, tenant N is serviced by independent set of SCMS backend components 724. In certain implementations, a service tier is associated with each tenant of the group of n tenants, and each tenant's service tier corresponds to one of a plurality of tiers ranging from a lowest service level to a highest service level.

In certain implementations, the dedicated registration authority 721 can also use the shared SCMS backend components 722. That is, implementations can create the dedicated registration authority 721 for tenant N that gives tenant N a unique interface, but the shared SCMS backend components 722 used by tenant N may be shared with other tenants (e.g., tenants A and B). In alternative or additional implementations, the dedicated registration authority 721 can access different sets of shared SCMS backend components 722 depending on product type(s) of computerized devices of a tenant that need certificates. That is, an OBUs of a given tenant may use one set of shared SCMS backend components 722 and RSUs for that tenant could use another set of shared SCMS backend components 722.

According to some implementations, a higher service tier can give tenant N access to the dedicated registration authority 721 that is not shared or used by other tenants. In one such implementation, the dedicated registration authority 721 can be created and configured for tenant N based on that tenant's higher service tier so that the dedicated registration authority 721 gives tenant N a unique interface. In some implementations, tenant N with a higher service tier is given access to isolated and independent backend SCMS components 724 that are not shared with other tenants. In additional or alternative implementations, another tenant with a higher service tier and a dedicated registration authority can access different shared SCMS backend components 722, depending on product type for that tenant's devices that need certificates. That is, an OBU device for a tenant may use one of the shared SCMS backend components 722 and an RSU device could use other shared SCMS backend components 722.

Figure 8A:
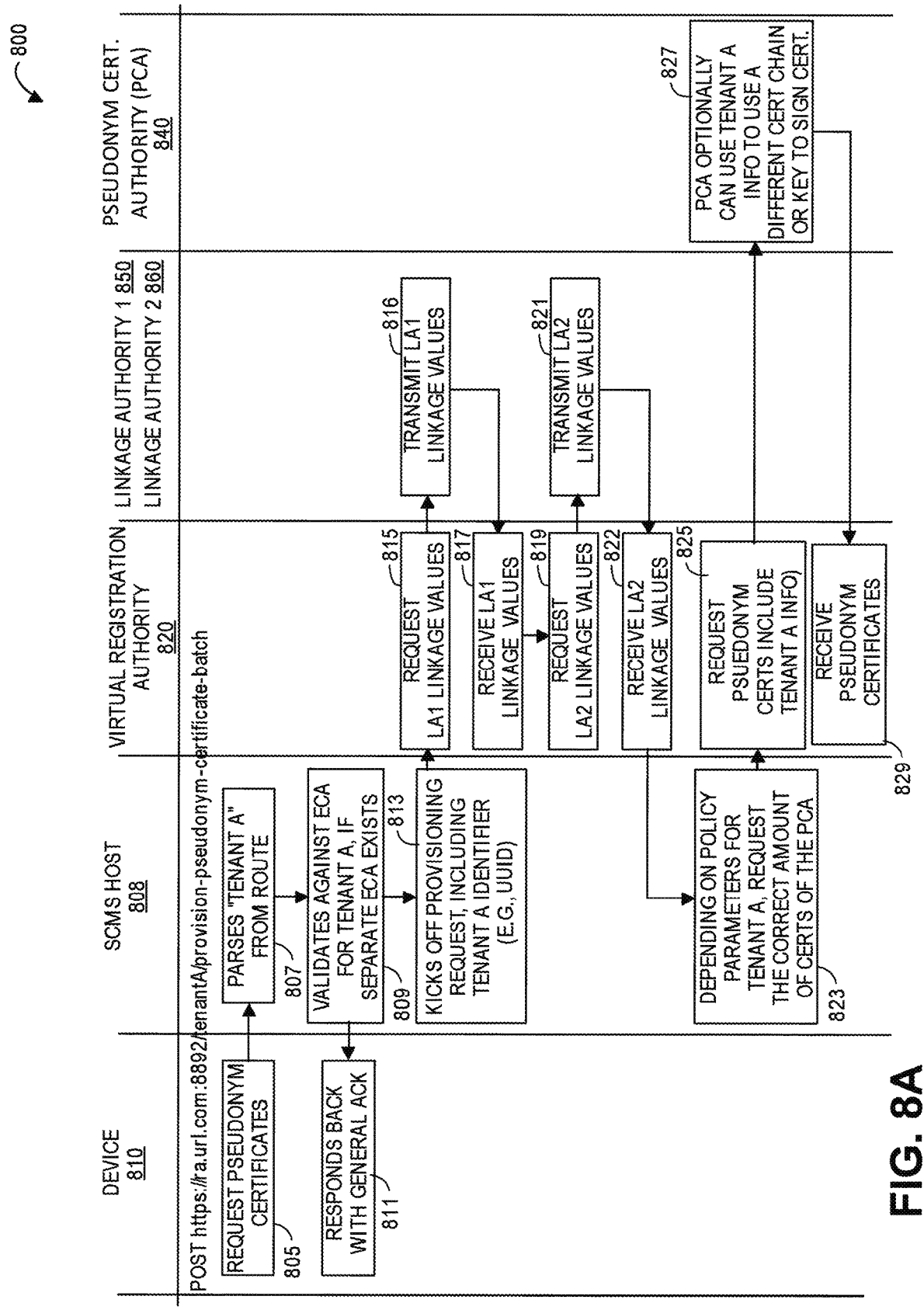
FIG. 8A is the first part of a swim-lane diagram illustrating an example of a process for securely providing credentials such as certificates, to multiple tenants, consistent with implementations of the invention.
Figure 8B:
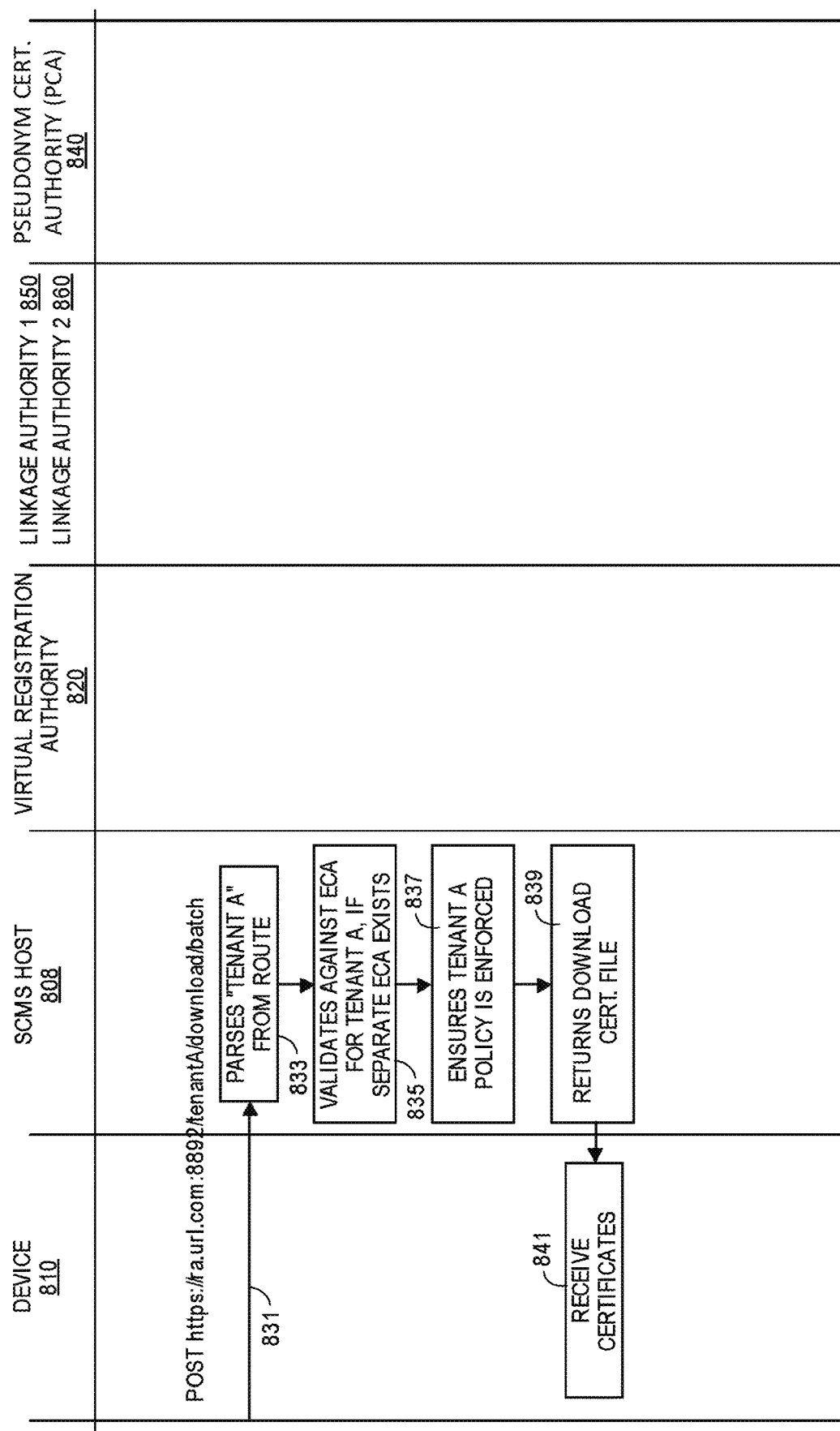
FIG. 8B is the second part of a swim-lane diagram illustrating an example of a process for securely providing credentials such as certificates, to multiple tenants, consistent with implementations of the invention.

FIGS. 8A and 8B are together a swim-lane diagram illustrating an example process 800 for securely providing credentials such as certificates, consistent with implementations of the invention. In the process 800, a virtual registration authority is used to provide certificates to multiple tenants.

In particular, the example process 800 illustrated in FIGS. 8A and 8B includes exchanges of requests and responses between enhanced SCMS components in order to provide certificates to V2X devices, such as device 810. However, implementations described herein are not limited to multi-tenant operations for V2X devices, and the disclosed principles can be applied to other types of computerized devices and computer-controlled devices, such as C2X devices. That is, the enhanced SCMS may function as a V2X or C2X certificate management service. The example process 800 depicted in FIGS. 8A and 8B provides certificates to V2X devices in a multi-tenant environment. That is, FIGS. 8A and 8B depict components of an example enhanced SCMS in the context of the V2X flow of requests and responses.

In various implementations, some or all of the process 800 or the operations shown may be performed by code executing on a computing system (which may include one or more processors or one or more computing subsystems), by a hardware-only system, or by a system that is a hybrid of the two. As shown across the top of FIGS. 8A and 8B, the entities involved with the process 800 include a device 810, an SCMS host 808, a virtual registration authority 820, linkage authorities 850, 860, and a pseudonym certificate authority 840. In various implementations, these entities may communicate with each other to carry out tasks as part of the process 800 for providing certificates, as described below with respect to FIGS. 8A and 8B and throughout this disclosure. In some implementations, the device 810 may be a V2X device located at a manufacturer (not shown).

In certain implementations, the SCMS host 808 may host the virtual registration authority 820. The process 800 can be performed by an enhanced SCMS communicates with devices (e.g., device 810) that submit provisioning requests.

The enhanced SCMS includes the virtual registration authority 820, one or more linkage authorities 850, 860, and the pseudonym certificate authority 840. An example CMS may include one or more application platforms that run an application for the virtual registration authority 820. These application platforms are communicatively connected to one or more compute engines that perform cryptographic computations required by the virtual registration authority 820. The one or more application platforms may include one or more virtual machines (VMs) or one or more hardware platforms (e.g., servers, computers, or other computer hardware capable of hosting and executing a software application). The enhanced SCMS may also include one or more VMs that run an enrollment certificate authority (not shown) and that are communicatively connected to one or more compute engines that perform cryptographic computations required by the enrollment certificate authority. The enrollment certificate authority is operable to generate and conditionally transmit enrollment certificates to the virtual registration authority 820. The example CMS host that hosts the virtual registration authority 820 of FIGS. 8A and 8B may further include one or more VMs that run an application for the pseudonym certificate authority 840 and that are communicatively connected to one or more compute engines that perform cryptographic computations required by the pseudonym certificate authority 840. The pseudonym certificate authority 840 is operable to generate and conditionally transmit pseudonym certificates to the virtual registration authority 820. The enhanced SCMS may also include one or more VMs that run first and second linkage authorities 850, 860 and that are communicatively connected to one or more compute engines that perform cryptographic computations required by the first and second linkage authorities 850, 860. Respective applications for the first linkage authority 850 and the second linkage authority 860 may be operable to generate and conditionally transmit linkage values to the virtual registration authority 820.

The enhanced SCMS that includes the virtual registration authority 820 shown in FIGS. 8A and 8B can also include one or more application platforms that run an application for the virtual registration authority 820 and that are communicatively connected to one or more compute engines that perform cryptographic computations required by the virtual registration authority 820. The enhanced SCMS can additionally include one or more application platforms that run an application for the enrollment certificate authority and that are communicatively connected to one or more compute engines that perform cryptographic computations required by the enrollment certificate authority, which may be operable to generate and conditionally transmit enrollment certificates to the virtual registration authority 820. The enhanced SCMS can further include one or more application platforms that run an application for the pseudonym certificate authority 840 and that are communicatively connected to one or more compute engines that perform cryptographic computations required by the pseudonym certificate authority 840, which may be operable to generate and conditionally transmit pseudonym certificates to the virtual registration authority 820. In addition, the enhanced SCMS can include one or more application platforms that run an application for the first linkage authority 850 and that are communicatively connected to one or more compute engines that perform cryptographic computations required by the first linkage authority 850. Lastly, the enhanced SCMS can also include one or more application platforms that run an application for the second linkage authority 860 and that are communicatively connected to one or more compute engines that perform cryptographic computations required by the second linkage authority 860. The linkage authorities 850, 860 may be operable to generate and conditionally transmit linkage values to the virtual registration authority 820.

In still other implementations, the enrollment certificate authority may be operable to generate enrollment certificates in response to receiving requests for enrollment certificates from the virtual registration authority 820; the pseudonym certificate authority 840 may be operable to generate pseudonym certificates in response to receiving requests for pseudonym certificates from the virtual registration authority 820; and the first linkage authority 850 and the second linkage authority 860 may be operable to generate linkage values in response to receiving requests for linkage values from the virtual registration authority 820. In alternative or additional implementations, the enrollment certificate authority may be operable to generate enrollment certificates in response to receiving requests directly from computerized devices. That is, there are multiple ways to get certificates and the example process 800 shown in FIGS. 8A and 8B is just one example method.

As shown in the example of FIG. 8A, the process 800 begins with operation 805 where the device 810 (e.g., an end entity V2X device) submits an initial provisioning request for pseudonym certificates to the SCMS host 808. As shown, 805 can include the device 810 submitting an HTTPS POST command with a URL that includes a tenant ID for tenant A. In some implementations, the device 810 is provided with a URL at enrollment time, the initial provisioning request in operation 805 comes directly from the device 810, and as shown in FIG. 8A, the provisioning request can be an HTTPS POST command with that URL and port number of the virtual registration authority 820 with the route defined and a tenant identifier (ID) embedded in the URL. This enables the SCMS host 808 to identify the tenant and route the request to the correct virtual registration authority 820 without having to change or reconfigure the device 810 or the process 800.

In some implementations, the provisioning requests can indicate configuration details for the tenant, application permissions needed (e.g., as indicated by Provider Service Identifier (PSID) values), and validity information for certificates. Such information can be passed via a route or in an HTTPS header. For example, a key value pair for an 'SCMS tenant' header element can include a value of 'tenant A.' Privacy of this information can be protected within a Transport Layer Security (TLS) handshake between the device 810 and the SCMS host 808.

In additional or alternative implementations, the provisioning request can be sent with Domain Name System (DNS) where two different URLs or routes resolve to (e.g., point to) the same server or web page. That is, by using DNS, requests from two different tenants that indicate the two tenant's respective tenant IDs can have different routes or URLs, but they will still both resolve to same enhances SCMS and same SCMS host 808. In the V2X environment (e.g., as specified by Crash Avoidance Metrics Partners, LLC ("CAMP")) an enrollment certificate is required to contain the application permissions (identified by PSID values) and the allowed geographic region for each RSU and OBU. An RSU or OBU device can only obtain application certificates and/or pseudonym certificates that correspond to the PSID values contained in the enrollment certificate.

At operation 807, after the device 810 sends a provisioning request to the SCMS host 808 with a URL for the virtual registration authority 820, the SCMS host 808 then parses the tenant ID (e.g., a UUID or other unique identifier for tenant A) from the request so that the request can be routed to the virtual registration authority 820 that handles that tenant. In this way, the process 800 can service multiple tenants with a single SCMS host 808, and handle custom configurations. In the example of FIG. 8A, at operation 807, the SCMS host 808 parses the tenant ID for tenant A from the request. In certain implementations, the provisioning request includes metadata indicating the tenant ID for tenant A, where the tenant ID can be a hash, UUID, or other type of unique ID that does not reveal the identity of tenant.

Then, at 809, the SCMS host 808 validates the tenant against an enrollment certificate authority to determine if a separate enrollment certificate authority exists for the tenant. According to certain implementations, downloads of an LPF and LCCF for the device 810 are accomplished through Representational State Transfer (REST) service calls and do not include an enrollment certificate (e.g., a signed message). For all other REST service calls in the process 800, the SCMS host 808 can perform a lookup at operation 809 to verify that a specific enrollment certificate for the device 8 is owned by or associated with a certain tenant (e.g., tenant A in the example of FIG. 8A). Therefore, a cryptographic validation can be made for these service calls to ensure they are allowed. For LPF and LCCF downloads, the tenant ID for tenant A in a URL (as shown in FIG. 8A), route, HTTP header, or other mechanisms can be used to determine which file to provide to the device 810. The downloaded LCCF can be consistent across all tenants (i.e., all certificates included). However, the downloaded LPF may be different per tenant. For other service calls in the process 800, a strong cryptographic link can ensure that the device 810 and certificate management is securely managed, even though a single registration authority (e.g., the virtual registration authority 820) or a single set of SCMS backend components (e.g., the set of shared SCMS backend components 722 discussed above with reference to FIG. 7) is handling different policies.

A primary role of the enrollment certificate authority is to fulfill requests, which can originate from the virtual registration authority 820, to issue enrollment certificates to end-user devices, such as, for example, the device 810. The enrollment certificate authority may interact directly with the SCMS host 808 in order to issue a requested enrollment certificate to device 810. In additional or alternative implementations, the enrollment certificate authority can communicate directly with the device 810 that is operable to act as a proxy between the enhanced SCMS and computerized devices needing enrollment certificates, with the computerized devices needing enrollment certificates, and with servers that act as proxies for clients that request enrollment certificates. For example, the enrollment certificate authority can communicate directly with a device 810 that is located at a manufacturer site (e.g., the manufacturer's factory). An enrollment certificate is a public key certificate that identifies its holder as an authorized participant in an ecosystem in which all participants must share valid enrollment certificates, (such as, for example, the USDOT V2X ecosystem), and in which authorized participants are able to also receive pseudonym certificates that enable communication and operation of a device 810 within the ecosystem (e.g., to enable communications and operations between vehicles and roadside infrastructure in the example of the USDOT's V2X ecosystem).

In various implementations, the validation performed in operation 809 may involve the SCMS host 808 decrypting and verifying the provisioning request, including signature verification, checking for revocation status of the device 810 that is the destination of the certificates (e.g., a computerized device) using a list of unapproved devices (e.g., a blacklist), and determining whether the requestor (e.g., device 810) is allowed to request certificates from the SCMS host 808. For instance, operation 809 may include determining whether a user from a manufacturer is an authorized user (e.g., part of a staff). In some implementations, the SCMS host 808 may also determine at 809 whether a computerized device (e.g., a product) to receive certificates is approved for use. In some instances, a list of approved devices (e.g., a whitelist) may be provided by a regulator and used by a provisioning controller to make this determination.

Next, at 811, the SCMS host 808 responds back to the device 810 with a general acknowledgment (ACK) message confirming the provisioning request has been received.

At 813, after the request for the certificates is verified, the SCMS host 808 initiates a provisioning request that includes the tenant ID for tenant A. In the example of FIG. 8A, the tenant ID is embodied as a UUID.

At operations 815-822, the linkage authorities 850, 860 interact directly with the virtual registration authority 820 in order to fulfill requests for linkage values. At 815, the provisioning request is received at the virtual registration authority 820, and the virtual registration authority 820 transmits a request for a first set of linkage values (LA1) to linkage authority 1 850.

At 816, in response to receiving the request for a first set of linkage values, the linkage authority 1 850 transmits the first set of linkage values to the virtual registration authority 820. The linkage authority 1 850 can transmit the first set of linkage values that have been previously generated (i.e., pre-generated linkage values), or the linkage authority 1 850 can generate and then transmit the first set of linkage values in cases where the values are not pre-generated. At 817, the first set of linkage values are received at the virtual registration authority 820. At 819, the virtual registration authority 820 transmits a request for a second set of linkage values (LA2) to linkage authority 2 860.

Next, as shown in FIG. 8A, at 821, in response to receiving the request for a second set of linkage values, the linkage authority 2 860 transmits the second set of linkage values to the virtual registration authority 820. In various implementations, the linkage authority 2 860 can transmit the second set of pre-generated linkage values, or alternatively, the linkage authority 2 860 can generate and transmit the second set of linkage values. At 822, the second set of linkage values are received at the virtual registration authority 820.

In certain implementations, the linkage authorities 850, 860 shown in FIGS. 8A and 8B can link the identity of the certificate requestor (i.e., a unique identifier of the certificate requestor's device), to an issued pseudonym certificate for revocation purposes. That is, the linkage authority 1 850 and linkage authority 2 860 respectively provide the first and second set linkage values as unique identifiers of the certificate requestor's device to a pseudonym certificate issued by the pseudonym certificate authority 840 as part of process 800. The linkage authority 1 850 and linkage authority 2 860 receive requests for linkage values sent from the virtual registration authority 820 at operations 815 and 819, and then provide the requested linkage values to the virtual registration authority 820 at operations 816 and 821.

With continued reference to FIG. 8A, at 823, the SCMS host 808 examines policy parameters for tenant A, and depending on the policy parameters, generates a request for the correct amount of pseudonym certificates from pseudonym certificate authority 840. In an example, operation 823 may include the SCMS host 808 using the parsed tenant ID from operation 807 to determine what policy parameters to abide by for the particular pseudonym certificate request. For instance, 823 may include retrieving local policy parameters for the device 810 from that device's LPF.

At 825, the virtual registration authority 820 transmits a request for the pseudonym certificates to the pseudonym certificate authority 840. This request may be sent as a batch of pseudonym certificate generation requests that are created by the virtual registration authority 820.

At 827, the request for the pseudonym certificates is received at the pseudonym certificate authority 840. In response to receiving the request at 827, the pseudonym certificate authority 840 optionally uses information for tenant A to use a different certificate chain or key to sign certificates. At 827, the pseudonym certificate authority 840 generates the requested pseudonym certificates and transmits the generated pseudonym certificates back to the virtual registration authority 820. At 829, the pseudonym certificates are received at the virtual registration authority 820.

Next, as shown in FIG. 8B, at 831, the device 810 may send a request to the SCMS host 808 to download a batch of certificates. As shown, the request sent at operation 831 may be an HTTP POST request with a URL that includes a tenant ID for tenant A.

At operation 833, the SCMS host 808 parses the tenant ID from the batch download request. Then, at 835, the SCMS host 808 validates the tenant against the enrollment certificate authority to determine if a separate enrollment certificate authority exists for the tenant.

Next, at 837, the SCMS host 808 ensures that a policy for tenant A is enforced. Operation 837 can include the SCMS host 808 using the parsed tenant ID from operation 833 to determine what policy parameters to abide by for the particular batch pseudonym certificate download request. For instance, 837 may include retrieving local policy parameters for the device 810 from that device's LPF. After ensuring that the policy for tenant A is being enforced with respect to the requested batch of pseudonym certificates, control is passed to operation 839.

At 839, when the pseudonym certificates are ready, the SCMS host 808 transmits the downloaded file with pseudonym certificates to the device 810. At 841, the device 810 receives the pseudonym certificates. At this point, the device 810 is provisioned with the pseudonym certificates and the device 810 can use the pseudonym certificates, and the operations for provisioning the pseudonym certificates are completed.

In additional or alternative implementations, processes similar to the process 800 described above can be used to provide certificates to other computerized devices, such as, for example, C2X devices. For instance, a CMS with components similar to those shown in FIGS. 8A and 8B can provide certificates to one or more On Board Unit (OBUs), Electronic Control Unit (ECUs), Road-Side Units (RSUs), and TMC devices. Such OBUs and ECUs can be configured to be installed into vehicles, watercraft (e.g., boats), aircraft (e.g., airplanes and drones), spacecraft, medical devices, robots, wireless or wired communication modules, and IoT devices. Similarly, the RSUs can be installed into traffic control devices (e.g., traffic signals), roadside content distribution systems, electronic tolling systems, electronic signage devices, and digital display devices (e.g., electronic billboards). A TMCD is operable to be installed in government (e.g., local, state or federal government) traffic management centers for use in digitally signing messages for broadcast or display by RSUs.

Figure 9:
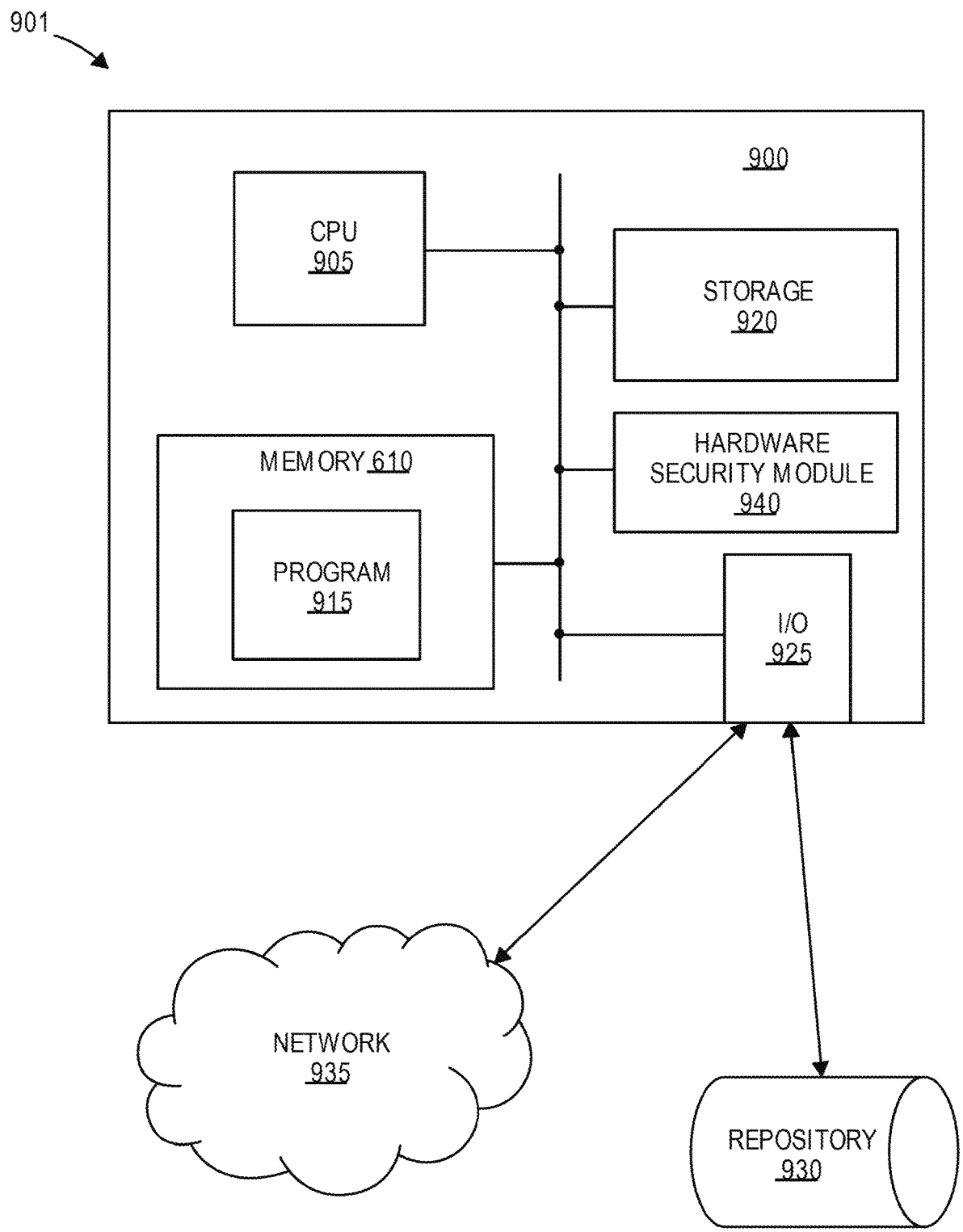
FIG. 9 is a block diagram of an example of a computing system that may be used for hosting systems and methods consistent with implementations of the invention.

FIG. 9 is a block diagram of an example of a computing environment 901, which includes a computing system 900 that may be used for implementing systems and methods consistent with implementations of the invention. Other components and/or arrangements may also be used. In some implementations, computing system 900 may be used to implement, at least partially, various components of FIGS. 1-8, such as the device 810, the virtual registration authority 820, the SCMS host 808, the linkage authorities 850, 860, and the pseudonym certificate authority 840 of FIGS. 8A and 8B, the components of the secure provisioning system 400 of FIG. 4, and the components of the operating environment 700 of FIG. 7. For example, computing system 900 may be used to implement, at least partially, the SCMS host 408 with virtual registration authorities, the CMPs 402, 602, the SMSs 404, 604, and the SMS databases 406, 606 of FIGS. 4 and 6, among other things. Also, for example, computing system 900 may be used to implement, at least partially, the SCMS host 708, registration authorities 720, 721, and the SCMS backend components 722, 724, of FIG. 7, among other things. In some implementations, a series of computing systems similar to computing system 900 may be each customized with specialized hardware and/or programmed as a specialized server to implement one of the components of FIGS. 1-8, which may communicate with each other via a network 935.

In the example shown in FIG. 9, the computing system 900 includes a number of components, such as a CPU 905, a memory 910, an input/output (I/O) device(s) 925, a hardware security module (HSM) 940, and a nonvolatile storage device 920. System 900 can be implemented in various ways. For example, an implementation as an integrated platform (such as a server, workstation, personal computer, laptop, etc.) may comprise a CPU 905, a memory 910, a nonvolatile storage 920, and I/O devices 925. In such a configuration, the components 905, 910, 920, and 925 may connect and communicate through a local data bus and may access a data repository 930 (implemented, for example, as a separate data source or database system) via an external I/O connection. The I/O component(s) 925 may connect to external devices through a direct communication link (e.g., a hardwired or local WiFi connection), through a network, such as a local area network (LAN) or a wide area network (WAN, such as a cellular telephone network or the Internet), and/or through other suitable connections. System 900 may be standalone or it may be a subsystem of a larger system.

The CPU 905 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. CPU 905 could also be an ARM CPU or a proprietary CPU. The memory 910 may be one or more fast storage devices configured to store instructions and information executed or used by the CPU 905 to perform certain functions, methods, and processes related to implementations of the present invention. The storage 920 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 910 contains one or more programs or applications 915 loaded from the storage 920 or from a remote system (not shown) that, when executed by the CPU 905, perform various operations, procedures, processes, or methods consistent with the present invention. Alternatively, the CPU 905 may execute one or more programs located remotely from the computing system 900. For example, the computing system 900 may access one or more remote programs via the network 935 that, when executed, perform functions and processes related to implementations of the present invention.

In certain implementations, the memory 910 may include a program(s) 915 for performing the specialized functions and operations described herein for the SCMS host 408 with virtual registration authorities, the CMPs 402, 602, the SMSs 404, 604, the SCMS host 708, registration authorities 720, 721, the sets of SCMS backend components 722, 724, the device 810, the virtual registration authority 820, the SCMS host 808, the linkage authorities 850, 860, and the pseudonym certificate authority 840 of FIGS. 4, 6, 7, 8A and 8B. In some implementations, the memory 910 may also include other programs or applications that implement other methods and processes that provide ancillary functionality to the invention.

The memory 910 may be also be configured with other programs (not shown) unrelated to the invention and/or an operating system (not shown) that performs several functions well known in the art when executed by the CPU 905. By way of example, the operating system may be Microsoft Windows™, Unix™, Linux™, an Apple Computers™ operating system, or other operating system, including real time operating systems. The choice of operating system, and even to the use of an operating system, is not critical to the invention.

The HSM 940 may be a device with its own processor that securely generates and stores digital security assets and/or securely performs a variety of cryptographic and sensitive computations. The HSM 940 protects digital security assets, such as cryptographic keys, and other sensitive data from possible access by an attacker. In some implementations, the HSM may be a plug-in card or board that attaches directly to the computing system 900.

The I/O device(s) 925 may comprise one or more input/output devices that allow data to be received and/or transmitted by the computing system 900. For example, the I/O device 925 may include one or more input devices, such as a keyboard, touch screen, mouse, and the like, that enable data to be input from a user. Further, the I/O device 925 may include one or more output devices, such as a display screen, a CRT monitor, an LCD monitor, a plasma display, a printer, speaker devices, and the like, that enable data to be output or presented to a user. The I/O device 925 may also include one or more digital and/or analog communication input/output devices that allow the computing system 900 to communicate, for example, digitally, with other machines and devices. Other configurations and/or numbers of input and/or output devices may be incorporated in the I/O device 925.

In the implementation shown, the computing system 900 is connected to a network 935 (such as the Internet, a private network, a virtual private network, a cellular network or other network or combination of these), which may in turn be connected to various systems and computing machines, such as servers, personal computers, laptop computers, client devices, etc. In general, the computing system 900 may input data from external machines and devices and output data to external machines and devices via the network 935.

In the exemplary implementation shown in FIG. 9, the repository 930 is a standalone data source external to system 900, such as a database. In other implementations, the repository 930 may be hosted by the computing system 900. In various implementations, the repository 930 may manage and store data used to implement systems and methods consistent with the invention. For example, the repository 930 may be used to implement the SMS databases 406, 606, of FIGS. 4 and 6 and the LPFs and LCCFs described herein. In some implementations, the repository 930 may manage and store data structures that contain the status and log information for each computerized device that has certificates provisioned by the secure provisioning system 400 of FIG. 4, and the like.

The repository 930 may comprise one or more databases that store information and are accessed and/or managed through the computing system 900. By way of example, the repository 930 may be an Oracle™ database, a Sybase™ database, other relational databases, or non-relational databases. Systems and methods consistent with the invention, however, are not limited to separate data structures or databases, or even to the use of a database or data structure.

One of ordinary skill will recognize that the components and implementation details of the system in FIG. 9 are examples presented for conciseness and clarity of explanation. Other components and implementation details may be used.

In the V2X environment as an implementation example, the current conventional security credential management systems (SCMS), as defined by the Collision Avoidance Metrics Partners, LLC (CAMP), cannot provide customizable configuration capabilities for a group of V2X devices owned or operated by a specific entity such as a city or state's department of transportation. Under the CAMP mechanism, separate conventional SCMS systems are required for each customer requiring such capabilities. The ability to provide custom configurations is desirable, but not available under the CAMP mechanism. The conventional V2X environment (e.g., as specified by CAMP) requires that the enrollment certificate contain the application permissions (identified by PSID values) and the allowed geographic region (geo-region) for each RSU and OBU. An RSU or OBU device can only obtain application certificates and/or pseudonym certificates that correspond to the PSID values contained in the enrollment certificate and the subsequently issued application and/or pseudonym certificates (e.g. top-off certificates) must contain the same allowed geo-region information as that contained in the enrollment certificate. The conventional V2X environment (e.g., as specified by CAMP) further requires that the initial provisioning step where the enrollment certificate is requested and installed in the RSU or OBU device be performed in a secure and trusted programming/provisioning location that is protected against unauthorized personnel, such as hackers.

The examples of implementations of the invention described with respect to FIGS. 10-13 below are particularly useful in solving a set of geographic-restriction technical problems associated with Roadside Units (RSU), also known as Roadside Equipment (RSE). One technical problem is related to the fact that conventional RSUs and conventional SCMSes (e.g., as defined by Collision Avoidance Metrics Partners, LLC (CAMP)), store or maintain geographic-location-restriction information only in the enrollment certificate of the RSU, which enrollment certificate is provided by the conventional SCMS only while the RSU is physically connected to a conventional Device Configuration Manager (DCM) system, which must be located in the RSU manufacturer's, or some other acceptable, secure and trusted programming location.

At the time of manufacture of an RSU, the manufacturer entity almost never will have all the information necessary to be inserted into the operational certificates (e.g., enrollment and/or application certificates), and in particular will not have precise information describing the RSU's future geographical location (geolocation) at the time that the RSU is deployed and operated by its buyer. This operating geolocation information from the device's enrollment certificate is important because proper operation of the RSU in the V2X environment is restricted to that geolocation.

In other words, the precise operating geolocation information for an RSU is unknown at the time of manufacture and enrollment certificate generation because the precise operating geolocation is typically only known after the unit is shipped by the manufacturer to the device buyer/owner/operator/user, who then places the RSU into an operational state and specific location. This is particularly true when the manufacturer produces RSU devices for inventory long before they are ordered, sold, and shipped to a user. At manufacture time, the manufacturer generally has no idea of who an RSU will eventually be sold to and where it will eventually be operating. As used in some embodiments described herein, the term "precise operating geolocation" refers to an area that is less than about 2,000,000 square meters (2 square kilometers), such as, for example, 900,000 square meters, 800,000 square meters, 700,000 square meters, 600,000 square meters, 500,000 square meters, 400,000 square meters, 300,000 square meters, 200,000 square meters, 100,000 square meters, 50,000 square meters, 40,000 square meters, 30,000 square meters, 20,000 square meters, 10,000 square meters, 9,500 square meters, 7,000 square meters, 5,000 square meters, 3,000 square meters, 2,000 square meters, 1,000 square meters, 600 square meters, 500 square meters, 400 square meters, 300 square meters, 200 square meters, 100 square meters, or 50 square meters, and this term includes a geographic point, such as the intersection of a latitude coordinate and a longitude coordinate. This area can be any shape. In general, a geo-region is an area that is larger than this such as a country or a state.

Thus, it is not possible using conventional systems to load an RSU with a precise geolocation-restricted enrollment certificate at the time of manufacture. To work around this problem, manufacturers load RSUs with enrollment certificates that specify a large geographic region (geo-region) within which the RSUs will likely be sold and deployed, such as an entire country (e.g., the United States) a group of states (e.g., New England, the mid-Atlantic states, etc.) or a state (e.g., Virginia). Although this allows the RSU's to be easily deployed (e.g., because the RSU will operate properly anywhere in the US), specifying a large geo-region for operation of the RSU is undesirable because it negates or significantly reduces many benefits and capabilities that a small or precise geolocation provides, such as the ability to use a specific road intersection, the ability to use physical map information, theft detection and prevention, loss detection, unauthorized or mistaken work site detection, and malicious use prevention, among others.

Furthermore, for portable RSU devices, data such as the operating geolocation changes over time, often very frequently. For instance, the precise operating geolocation for a portable RSU often changes from day to day as a work crew using the RSU moves from work site to work site. A work crew may use a portable RSU to, for example, broadcast messages to vehicles warning that the work crew is present or indicating that a lane of the highway is closed by the work crew. In the V2X environment, the information from the RSU broadcast may be used to inform or warn approaching drivers in connected V2X vehicles about the work site and/or to direct autonomous V2X vehicles.

Using the current conventional SCMSes and V2X provisioning systems and procedures to provide up-to-date, precise, operating geolocation information to such a mobile RSU requires physically transporting the RSU to the manufacturer, (or to another trusted, secure programming/provisioning location), connecting it to the DCM device at the secure location, and provisioning it with a new enrollment certificate containing the precise operating geolocation information for the RSU and work crew. This is impractical, expensive, time consuming, and inefficient, as it entails having the owner physically move the RSU to and from the secure location each time a work crew wants to change work locations, which could be daily.

Moreover, such trusted, secure, programming/provisioning locations are not widespread—for example, they are currently not available at city traffic management centers or at local, state or Federal DOTs. And, a significant technical drawback with the conventional enrollment-certificate-based approach is that RSUs provided with precise operating geolocation information are essentially inoperable in the V2X environment for use at a different work site until they are physically brought into a trusted, secure provisioning location and re-provisioned with new enrollments certificates specifying the operating geolocation of the new work site. Consequently, re-provisioning RSU enrollment certificates to update the geographic restriction information is virtually never done with existing RSU, and instead large geo-regions (e.g., the U.S.) are provisioned by the manufacturer and left unchanged.

The systems, methods, and devices described herein address the above-mentioned problems and drawbacks by providing, among other things, an improved, easily updatable, application certificate that includes precise operating geolocation information, an improved application certificate provisioning request that allows the requestor to specify a precise operating geolocation, new processes for generating and providing application certificates having accurate & precise geographic-restriction information and an enhanced SCMS that performs the processes, and improved computerized devices, such as RSUs, that employ the precise, operating geolocation information from the improved, geographically restricted application certificates provisioned to the RSU.

Figure 10:
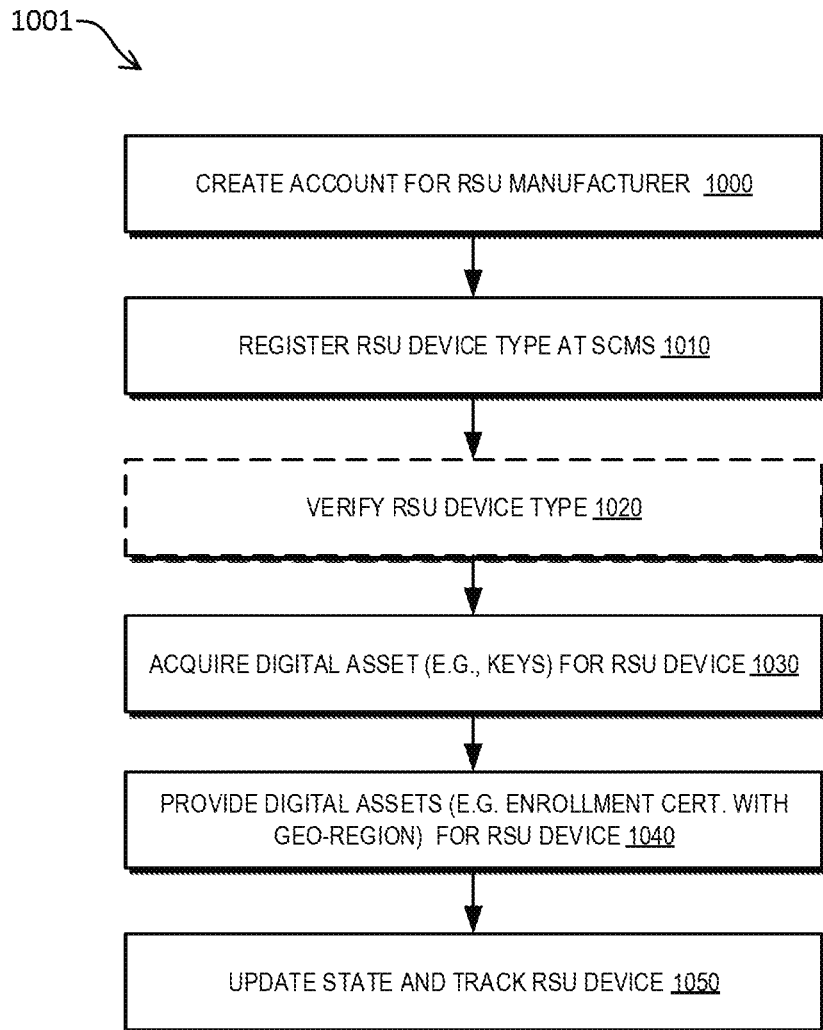
FIG. 10 is a diagram depicting an example of a method for initially provisioning and tracking RSUs, consistent with implementations of the invention.

FIG. 10 is a diagram depicting an example of a method 1001 for initially provisioning and tracking RSUs, consistent with implementations of the invention. In various implementations, the method 1001 may be implemented by an enhanced SCMS 400, as described previously. For example, the method 1001 may be implemented by the enhanced SCMS 400 in interaction with the RSU device manufacturer when the RSU is newly manufactured.

In the example shown, the method begins at 1000 when a customized account is created for an entity at an entity management system of an enhanced SCMS 400. In various implementations, and for the purposes of the example described with regard to FIG. 10, the end entity may be the manufacturer of an RSU device, such as the manufacturer of a V2X RSU device 410. One of ordinary skill will recognize, however, that the same or similar devices and processes as described herein may be used for other types of computerized devices (e.g., IoT devices or other devices 410) that use or need geolocation-specific digital assets.

In various implementations, the enhanced SCMS 400 can create an account for the RSU manufacturer (at 1000) after receiving a request from the RSU manufacturer. The request to create the account can include, for example, an identifier of the RSU manufacturer, information about the RSU manufacturer, a subscriber type for the RSU manufacturer (e.g., a Tier-1 manufacturer), a security asset(s) associated with the RSU manufacturer, etc.

In 1010, the method 1001 performed by the enhanced SCMS 400 can register a device type in the enhanced SCMS 400. For example, a request to register an RSU device type can be received from an RSU manufacturer via their account or can be received from an administrator of the enhanced SCMS 400. In some implementations, the request to register the RSU device type can include an identifier of the RSU device type or a security asset associated with the RSU device type. The enhanced SCMS 400 can register the device type by storing the identifier of the RSU device type in, for example, an SMS database 406.

In 1020, the enhanced SCMS 400 can optionally verify whether the RSU device type is approved by an authorizing body (e.g., a DOT in the case of an RSU). For example, the SCMS 400 can transmit the identifier and/or a security asset to a server associated with the authorizing body to request verification and/or can compare the identifier and/or security asset to a list of approved device types previously stored in the SMS database 406. The SCMS can then store an indication of whether the device type is verified or not, e.g., in the SMS database 406.

In 1030, the SCMS 400 can acquire a digital asset(s) (e.g., public keys) for an RSU device (e.g., enrollment certificate public keys, signature keys, encryption keys, AES butterfly key expansion values, and the like) and acquire or generate an identifier for the RSU device. For example, the public keys can be received from the RSU device or the RSU manufacturer can access their account via an entity management system 404 and input the digital asset(s) (e.g., the public keys) and/or input the identifier. The digital asset(s) and/or identifier for the device can be stored in the SMS database 406.

In 1040, the enhanced SCMS 400 can send, transmit, return, or otherwise provide new digital assets (e.g., digital assets that were generated and/or previously stored by the SCMS 400) to the RSU manufacturer to be provisioned on the RSU device by the RSU manufacturer and/or return new digital assets to the RSU device itself. In some embodiments, the new digital assets may be derived from, or created using, or otherwise based on or the digital asset(s) acquired in 1030. In various embodiments, the enhanced SCMS 400 may transmit, return, or provide an enrollment certificate and/or an LPF and/or an LCCF at this point in the RSU's provisioning life cycle. In addition, the enhanced SCMS 400 may transmit or provide SCMS-contact information (e.g., a URL) to the RSU, which the RSU can subsequently use to contact the enhanced SCMS 400 to obtain other digital assets.

An enrollment certificate is a public key certificate that identifies its holder as an authorized participant in an ecosystem in which all participants must share valid enrollment certificates, (such as, for example, the USDOT V2X ecosystem), and in which authorized participants are able to also receive pseudonym certificates and application certificates that enable communication and operation of a computerized device within the environment or infrastructure (e.g., to enable communications and operations between vehicles and roadside infrastructure devices in the example of the USDOT's V2X environment or infrastructure).

In various embodiments, at least one digital asset, such as the enrollment certificate, returned at 1040 includes information specifying a geo-region in which the RSU device is authorized or allowed to operate. In various embodiments, the geo-region information may specify a geographic area or region in which the RSU device can function properly as part of the V2X environment. This geographic region may be referred to as the "allowed geo-region" of the RSU, and examples include regions such as a specific country (e.g., U.S.A.), state(s) (e.g., Virginia or the New England states), counties (e.g., Fairfax County, Va.), city (e.g., Richmond, Va.) or within some other geographic territory or region defined by coordinates, boundaries, or the like. In such embodiments, the RSU device may operate, function, and/or cooperate properly with other V2X devices (i.e., in the V2X environment) only in the allowed geo-region of the RSU, as specified in the returned digital asset, e.g., in the enrollment certificate.

Note that in various embodiments, the digital asset (e.g., enrollment certificate) returned by the enhanced SCMS 400 in operation 1040 typically specifies a large "allowed" geographic region, such as a country, a group of states, or a state, because at this point the RSU device is typically not yet deployed (e.g., it is still in the factory of the RSU manufacturer), and thus the exact future operational location of the RSU is not yet certain, as described previously.

In some implementations, the enhanced SCMS 400 may also return a registration authority URL and certain configuration data for final programming into the RSU device. For example, the registration authority URL may be unique to the end entity and/or customized by the end entity (via the entity management system). As a further example, the registration authority associated with the URL can be a virtual registration authority associated with an SCMS host 408 of the enhanced SCMS 400.

In various implementations, the enhanced SCMS 400 receives public keys from the computerized RSU device that will eventually need geolocation-specific application certificates. For example, the enhanced SCMS 400 may receive public keys for the RSU device, and may return public keys, an LPF, an LCCF, and other data to the RSU device.

In 1050, the enhanced SCMS can set the state of the RSU device to initially provisioned, for example, in the record in the SMS database 406 for the RSU device, and can use the RSU's record in the SMS database 406 to track future interactions with the RSU device, such as when the device is further provisioned by an owner or operator (e.g., a DOT) at a subsequent stage of the RSU's lifecycle, as described below with regard to FIG. 11.

Figure 11:
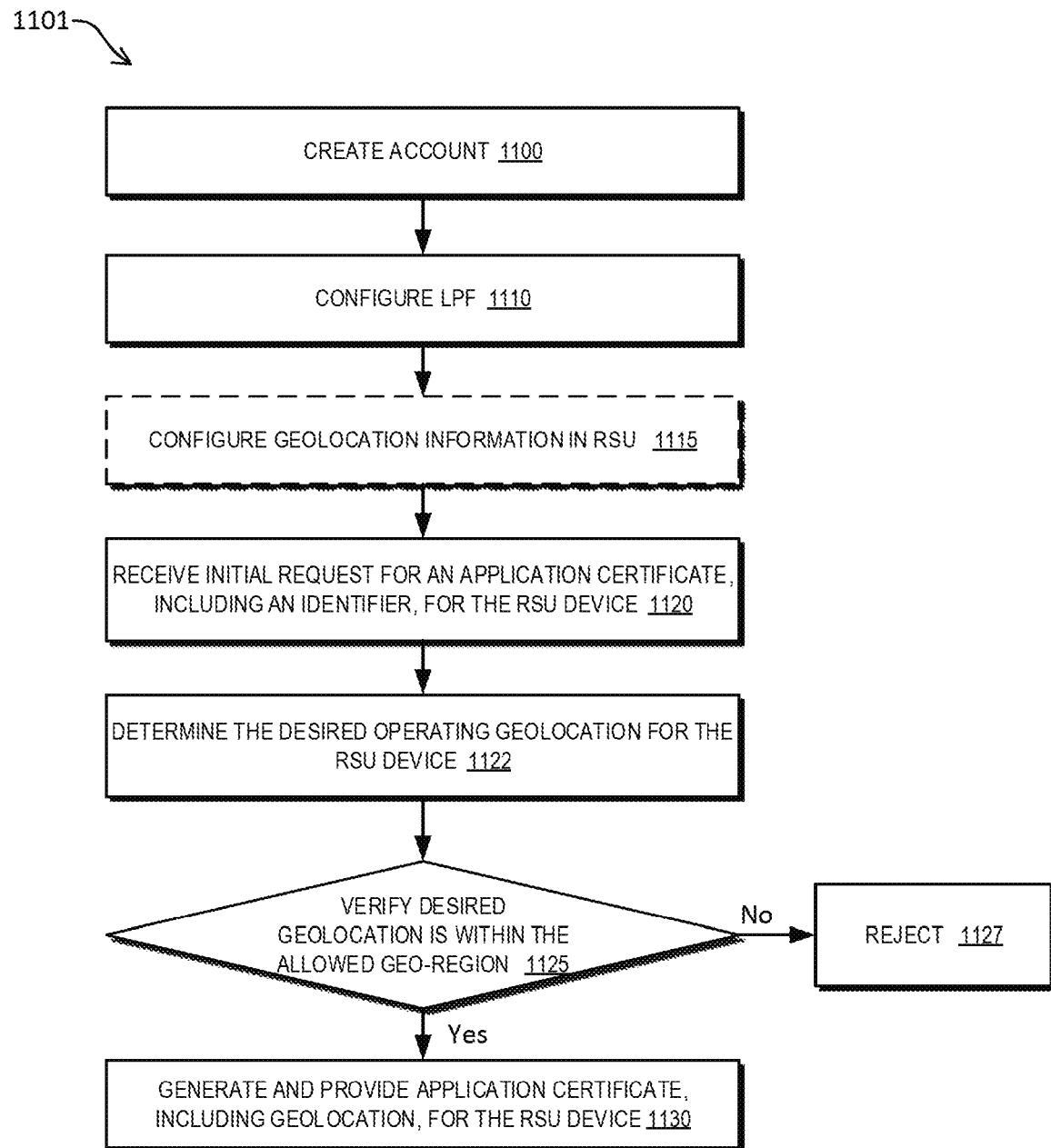
FIG. 11 is a diagram depicting an example of a method for configuring a deployed RSU, consistent with implementations of the invention.

FIG. 11 is a diagram depicting an example of a method 1101 for configuring a newly deployed RSU, consistent with implementations of the invention. For example, the method 1101 may be implemented by the enhanced SCMS 400 and the RSU device owner or user who just received the RSU from its manufacturer, where the owner/user now needs to finish configuring the RSU for operation use.

In the example shown, the method 1101 begins at 1100 when a device-user's account is created by or for an RSU purchaser, user, operator, or owner, such as a state government's Department of Transportation or the like, which creation may be done using the enhanced SCMS 400. In various implementations, the device-user's account can be created and/or managed via an entity or subscriber management system 404 of the enhanced SCMS 400. Additionally, in some implementations and for the purposes of the example described with regard to FIG. 11, the device user can be a DOT's traffic management center that purchases and operates RSU V2X devices and/or operates a V2X product or device that incorporates one or more RSU devices. In some implementations, the entity creating the account could be national government entity, such as the USDOT or an approval body, which may use the SCMS 400 to create and manage a database of approved V2X devices that may be issued digital assets.

In some implementations, the enhanced SCMS 400 can create an account for the user of the RSU based on data received in a request from the RSU user. The request to create the account can include, for example, an identifier of the RSU user, information about the RSU user, a type describing the RSU user (e.g., an authorization authority, a traffic management center, a private construction company, etc.), a digital asset associated with the RSU user, etc.

In some implementations, creating an account for the RSU user can include generating one or more default LPFs for the RSU user. In some cases, different default LPFs can be associated with different device types.

In 1110, the enhanced SCMS 400 can configure an LPF, e.g., in response to a received request to configure the LPF, for example, from the RSU user. For instance, the request to configure the LPF can be a request to configure a workflow for an RSU, a request to set a URL of a registration authority, set the types of authorized digital assets, etc.), a request to configure a PSID, and the like. In some implementations, a top-off policy can be used to determine how to respond to a top-off request, as described with regard to FIG. 3 above. In further implementations, a top-off policy can be set based on a device type, based on the enrollment certificate associated with a device, and/or based on a geo-region or a precise geolocation associated with the device.

At 1115, precise operating geolocation information may be configured in an RSU device; this operation is optional, as indicated by the dashed lines forming the box of 1115. For example, that RSU owner may write or store geolocation restriction information in the non-volatile memory of the RSU device. For the case where the RSU is a portable RSU that is used by a roadwork crew or the like, the RSU owner, (e.g., a state's Department of Transportation) may write or store an operating geolocation that represents where the roadwork crew is working or operating that day, (i.e., where the RSU will be operating), such as a set of geographic coordinates (e.g., GPS coordinates or latitude and longitude coordinates), a specific intersection, a specific stretch of roadway, a small area defined by a set of coordinates, or the like. In various embodiments, the RSU owner may enter the operating geolocation information in the RSU according to the RSU manufacturer's instructions and/or via the CMP 402 of an enhanced SCMS 400.

In various embodiments, the RSU device can function properly as part of the V2X environment only at or in the location specified by the operating geolocation of its application certificate. In such embodiments, V2X devices that communicate with the RSU device when the RSU is at a location other than, or too far away from (e.g. more than 10 to 500 meters from), the operating geolocation, may recognize that the RSU device is operating outside of its proper location and may consequently ignore signals from that RSU and/or report the RSU as malfunctioning or operating anomalously in the V2X infrastructure.

In some implementations, operation 1115 may be replaced or supplemented by a sub-process or operations (not shown), wherein the geolocation information may be configured or stored in the enhanced SCMS 400 (e.g., in the SMS db 406) by the owner/user of the RSU, e.g., via the CMS 402. For example, that RSU owner may log onto the enhanced SCMS 400 using the CMS 402 and submit a request to store the operating geolocation for a specific RSU device, and the request may include the desired operating geolocation for that RSU device. In response, the enhanced SCMS 400 may store the desired or requested operating geolocation for that specific RSU into the SMS db 406. In such implementations, the enhanced SCMS 400 can later look up the stored operating geolocation using the unique identifier for the RSU, which enables the enhanced SCMS 400 to generate an application certificate for that specific RSU using the operating geolocation information stored by the owner/user in the SMS db 406.

In various implementations, optional operation 1115 and/or the sub-process of the previous paragraph may be eliminated from the method 1101. In some implementations, optional operation 1115 and/or the replacement sub-process may be performed before the method 1101 begins.

At 1120 according to the example of a method shown in FIG. 11, the SCMS 400 may receive the initial request for an application certificate for the RSU device, e.g., from the RSU or from the owner of the RSU device via the CMP 402. In various implementations, the request may include an identifier of the RSU device and come from the RSU device. In some implementations, the identifier can be received and matched to the account created for the user of the RSU device in 1100.

In some implementations, the identifier can be an identifier that was received or generated by the enhanced SCMS 400 in 1040, described above, and the enhanced SCMS 400 can identify the RSU device and/or the type of the V2X device being "RSU" based on the received identifier.

In some implementations, the initial request for the application certificate for the RSU will also include, in addition to the RSU identifier, a desired or requested operating geolocation that may become part of the application certificate supplied to the RSU and that specifies where the RSU will be operating (e.g., the request may include geolocation information specifying a particular intersection or latitude and longitude coordinates or other geographical or geometric specification). In some implementations, the desired operating geolocation may be specified with information or data that includes three or more geographic coordinates forming a greater-than-zero area, and the area may be of any shape. Additionally or alternative, the desired operating geolocation may be specified with information or data that includes a central point (e.g., a latitude and longitude point) and a radius, which define a circular area. Other formats for specifying a geographic area can also be used.

In some such implementations, the requested operating geolocation included in the request at 1120 may match the geolocation that is optionally put into the RSU device at 1115. In some embodiments in which the RSU device is sending the initial request received at 1120, the RSU device may read the operating geolocation that was stored in the RSU device at 1115 and use that operating geolocation to formulate or include with the initial request.

Some implementations that include the operating geolocation in the initial request for the application certificate at 1120 may modify a conventional request structure and protocol, EeRa*CertProvisioning Request (where star indicates any EE-RA certificate request), to add a new, geolocation field to the CommonProvisioningRequestFields used in the conventional EeRa*CertProvisioningRequest, as this geolocation field does not exist in the conventional CAMP-specified software and data. In such implementations, this new field is used to specify the desired operating geolocation of the device, which should be within (e.g., a subset of) the geo-region contained in the RSU's enrollment certificate. This new field and improved EeRa*CertProvisioning Request format enables the RSU to request application certificates with the appropriate operating geolocation without causing the owner/operator to have to retrieve the RSU from the field or from a TMC and transport and reprogram it in a specialized secure programming/provisioning location.

In some embodiments (not shown in FIG. 11), the enhanced SCMS 400 may at this point (e.g., after receiving the request at 1120) determine whether the RSU device is authorized to request and receive digital assets from the enhanced SCMS 400, as described below with respect to operations 1210, 1220, and 1240 of FIG. 12, before proceeding to 1125.

At 1122, the method 1101 determines the desired or requested operating geolocation for the RSU device. This may be done in different ways for different embodiments and implementations.

For implementations that include the desired operating geolocation for the RSU device in the request received at 1120, the enhanced SCMS 400 determines the desired operating geolocation by obtaining the operating geolocation information from the request, for example, by parsing the received request, reading the appropriate field of the request's data, or the like.

For implementations wherein the owner/operator/user of the RSU has previously stored the operating geolocation for the RSU device in the enhanced SCMS 400, (e.g., as described above in conjunction with 1115), the enhanced SCMS 400 determines the desired operating geolocation by obtaining the operating geolocation information from its storage location, for example, by looking up the storage location using or based on the unique identifier of the RSU device (e.g., a database lookup), and reading the operating geolocation information, or the like.

At 1125, the method 1101 verifies that the desired operating geolocation is within, a subset of, part of, or otherwise corresponds to the allowed geo-region. In various implementations, the allowed geo-region may be specified in the enrollment certificate of the RSU device, specified as part of the initial request received at 1120; and/or stored in the SMS database 406 in association with the RSU device as part of operation 1010 and/or operation 1050 of the method 1001 of FIG. 10, and the enhanced SCMS 400 may obtain the allowed geo-region from one or more of those sources.

In the implementation shown, the enhanced SCMS 400 compares or analyzes the desired operating geolocation with respect to the allowed geo-region (e.g., the geo-region as specified in the enrollment certificate of the RSU) and if the desired geolocation is not within, a subset of, or otherwise in correspondence with the allowed geo-region (operation 1125, No), then the method 1101 branches to operation 1127 and rejects the request for that application certificate for the RSU. For example, if the desired geolocation is a stretch of roadway in Virginia, and the allowed geo-region is the states of Maryland and Delaware, then the request is rejected. In various implementations, rejecting the request may include the enhanced SCMS 400 sending an error message to the requesting entity or device, such as to the requesting RSU or to the RSU owner/user.

If, on the other hand the desired geolocation is within or otherwise corresponds to the allowed geo-region (operation 1125, Yes), then the method 1101 branches to operation 1130 and generates and provides or returns the requested application certificate(s) for the RSU. For example, if the desired geolocation is an intersection in Maryland, and the allowed geo-region is Maryland and Delaware, then the SCMS 400 generates an application certificate for the RSU, and the application certificate contains information specifying the operating geolocation as the intersection in Maryland. The SCMS 400 then transmits or otherwise provides the new application certificate to the requestor.

In some embodiments, at 1130, the enhanced SCMS 400 may also provide or return an LPF and/or an LCCF to the RSU device with the requested application certificate. In some implementations, the information returned to the RSU device can be determined based on the device identifier received in 1120. For example, the LPF that is returned can correspond to an LPF for the RSU device type selected and/or customized by the RSU owner associated with the RSU device. Furthermore, after providing the application certification and/or other information to the RSU device at 1130, the enhanced SCMS 400 may set the state of that RSU device to "provisioned" or "partially provisioned" in the SMS database 406. In various implementations, a device state of provisioned indicates that the device has its application certificates, and other files, such as, for example, an LPF and an LCCF. A device state of partially provisioned can be used to indicate that a computerized device only has some of some of these digital assets.

Figure 12:
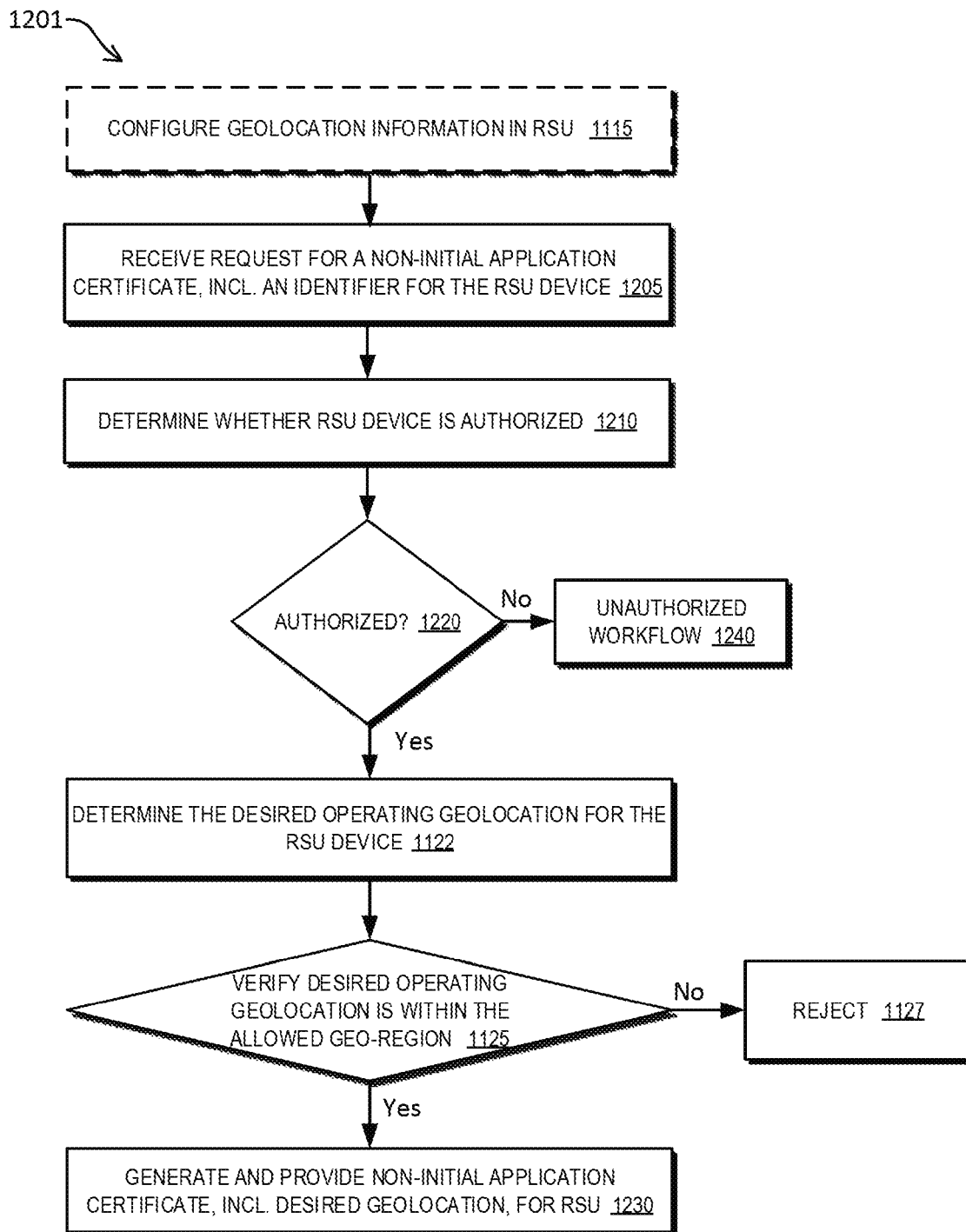
FIG. 12 is a diagram depicting an example of a method for providing non-initial digital assets to a deployed RSU device, consistent with implementations of the invention.

FIG. 12 is a diagram depicting an example of a method 1201 for providing non-initial digital assets to a deployed RSU device, consistent with implementations of the invention. In various embodiments, the method 1201 may be implemented by the enhanced SCMS 400 and the RSU or the RSU device owner/user who has been using the RSU, and now needs to deploy the RSU to a new geolocation different from where it was previously deployed. For instance, a portable RSU may have been previously initially provisioned per FIG. 11, and the RSU may require re-provisioning with, e.g., new application certificate(s) that reflect a new operating geolocation where the RSU is going to be used with a road crew that day. If the RSU is not re-provisioned with new application certificate(s) that reflect the new operating geolocation, then the V2X vehicles would ignore or reject the information broadcast by the RSU because those vehicles would see that the information is not applicable to their current geolocation.

In the example shown, the method 1201 can optionally begin with configuring geolocation information in an RSU device, as at 1115. For example, the RSU owner may write or store the operating geolocation information into the non-volatile memory of the RSU device, as described previously.

At 1205, the method 1201 includes receiving a request for a non-initial application certificate(s); i.e., a certificate that is not the first or initial certificate for that RSU, (which was described in FIG. 11). In various implementations, the request of 1205 may be sent or provided to the SCMS 400 by an RSU device that already has an application certificate that may be expiring or otherwise in need of replacement or the request may come from a user via the CMP 402. In various implementations, the request may include an identifier of the RSU device, as described previously with respect to FIG. 11.

In some implementations, the request for the non-initial application certificate for the RSU will also include information indicating the desired operating geolocation for the RSU, which will be included in or become part of the non-initial application certificate supplied to the RSU and which specifies where the RSU will be operating geographically, as described previously. In some embodiments in which the RSU device is sending the non-initial request received at 1205, the RSU device may read the operating geolocation that was stored in the RSU device at 1115 and use that operating geolocation to formulate the non-initial request. In various embodiments, the non-initial request may be an improved EeRa*CertProvisioningRequest with a desired operating geolocation field added, which enables the RSU to request application certificates with the appropriate operating geolocation.

At 1210, the method 1201, e.g., as performed by the enhanced SCMS 400, can determine or verify whether the RSU device is authorized to use the SCMS system 400 and/or to be provided with digital assets such as a non-initial application certificate. For example, the enhanced SCMS 400 can access information from or associated with the account of the user of, or associated with, the RSU device to determine whether or not the RSU device is an authorized device, e.g., that has an active status.

At 1220, if the RSU device is not authorized (1220, No), then the method 1201 branches to the unauthorized workflow 1240, in which the RSU device will be denied or rejected from receiving the requested non-initial application certificate. The enhanced SCMS 400 will not provide certificates to unauthorized devices. Devices may be unauthorized due to payment failure, compromise, a revoked status, a stolen status, a misbehaving status, an inactive status, etc. In various implementations, an end entity, such as the RSU owner, may change the status of the V2X devices that are registered by or otherwise associated with the entity, for example, between active status and inactive status. For example, if an RSU device is stolen from a work crew or otherwise compromised, the RSU owner may log into the enhanced SCMS 400 and change the status of that RSU device from active to inactive. In some implementations, the unauthorized workflow 1240 may be customized for the end entity (e.g., the owner) associated with the RSU device, as described previously with respect to FIG. 3.

If, on the other hand, the RSU device is authorized to receive digital assets, (1220, Yes), then the method 1201 branches to 1122.

At 1122, the method 1201 determines the desired or requested operating geolocation for the RSU device. This may be done in different ways for different embodiments and implementations, as described above with respect to FIG. 11.

At 1125, the method 1201 verifies that the desired operating geolocation, as determined at 1122, is within, a subset of, part of, or otherwise correspondent to the allowed geo-region, as described above with respect to FIG. 11.

In the implementation shown, if the desired operating geolocation is not a subset of the allowed geo-region (operation 1125, No), then the method 1201 branches to operation 1127 and rejects the request for that application certificate for the RSU. For example, if the desired operating geolocation is specified by latitude and longitude coordinates in Virginia, and the allowed geo-region is Maryland and Delaware, then the request is rejected at 1127.

If, on the other hand the desired operating geolocation is within the allowed geo-region (operation 1125, Yes), then the method 1201 branches to operation 1230 and generates and provides or returns the requested non-initial application certificate(s) for the RSU. The generated non-initial application certificate(s) may contain or include information indicating the operating geolocation that was determined at 1122. For example, if the desired operating geolocation is specified by latitude and longitude coordinates in Maryland, and the allowed geo-region is Maryland and Delaware, then the SCMS 400 may generate and transmit the non-initial application certificate(s) for the RSU, and the provided application certificate(s) may contain information specifying the operating geolocation as the specified latitude and longitude coordinates.

In variations of the implementation shown in FIG. 12, the enhanced SCMS 400 may process other requests related to deployed devices, such as deployed RSUs, in a manner similar to the method 1201. For example, the enhanced SCMS 400 may receive a request to provide or configure an LPF for a device, such as an RSU, after the device is initially deployed. In such variations, the request to provide or configure the LPF may be a request to change the number of allowed application certificates to be issued and used per week, and the enhanced SCMS 400 may update the existing LPF for the requesting RSU device (or created a new LPF)

with this new configuration, and then transmit or otherwise provide the updated or new LPF to the requesting RSU device, e.g., when the RSU device next contacts the enhanced SCMS 400.

Figure 13A:
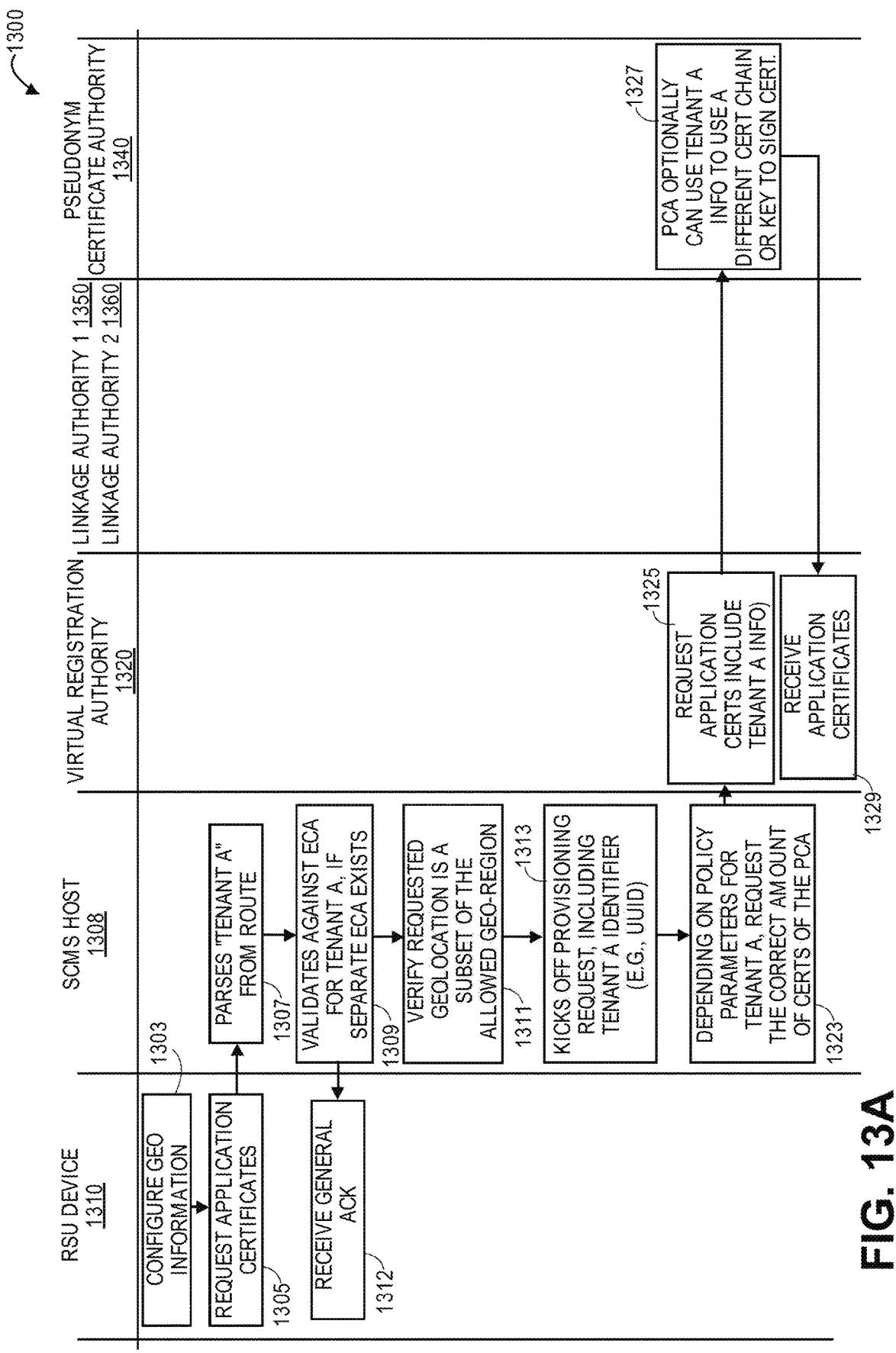
FIG. 13A is the first part of a swim-lane diagram illustrating an example of a process for securely providing digital assets, such as application certificates containing geolocation information, to multiple tenants, consistent with implementations of the invention.
Figure 13B:
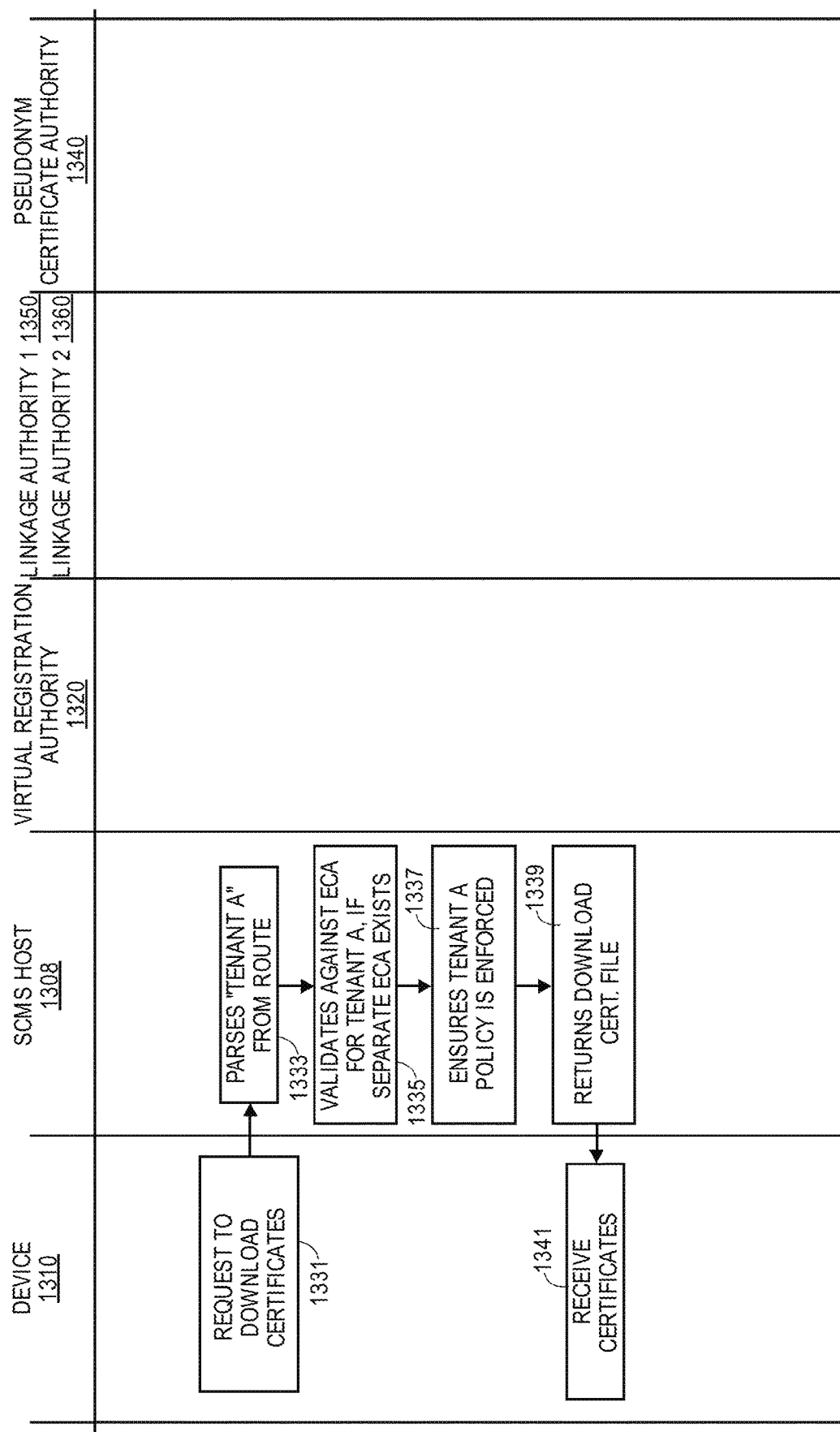
FIG. 13B is the second part of a swim-lane diagram illustrating an example of a process for securely providing digital assets, such as application certificates containing geolocation information, to multiple tenants, consistent with implementations of the invention.

FIG. 13A and FIG. 13B are a swim-lane diagram illustrating an example of a process 1300 for securely providing digital assets, such as application certificates containing geolocation information, to one or more tenants, consistent with implementations of the invention. In the implementation illustrated by the process 1300, a virtual registration authority is used to provide certificates to multiple tenants.

In particular, the example of a process 1300 illustrated in FIGS. 13A and 13B includes exchanges of requests and responses between enhanced SCMS components in order to provide geolocation-containing certificates to V2X devices, such as an RSU device 810. However, implementations described herein are not limited to multi-tenant operations for V2X devices, and the disclosed principles can be applied to other types of computerized devices and computer-controlled devices, such as IoT devices.

In various implementations, some or all of the process 1300 or the operations shown may be performed by code executing on a computing system (which may include one or more processors or one or more computing subsystems), by a hardware-only system, or by a system that is a hybrid of the two. As shown across the top of FIGS. 13A and 13B, the entities or devices involved with the process 1300 include an RSU device 1310, an SCMS host 1308, a virtual registration authority 1320, and a pseudonym certificate authority 1340. In various implementations, these devices may communicate with each other to carry out tasks as part of the process 1300 for providing geolocation-bearing certificates, as described below with respect to FIGS. 13A and 13B and throughout this disclosure.

In certain implementations, the SCMS host 1308 may be one or more computing systems (e.g., secure or specialized servers) that host the virtual registration authority 1320. The process 1300 can be performed by an enhanced SCMS (e.g. enhanced SCMS 400) that communicates with computerized devices (e.g., RSU device 810) that submit provisioning requests.

The enhanced SCMS may include the virtual registration authority 1320, one or more linkage authorities 1350, 1360, and the pseudonym certificate authority 1340, similar to that described above with respect to FIG. 8.

As shown in the example of FIG. 13A, the process 1300 begins at 1303 with configuring geographic information in the RSU device 1310. In various embodiments, this may be done by configuring an enrollment certificate that is installed in the RSU device 1310 with geo-region information, for example as described with respect to operation 1040 of FIG. 10, and/or by writing or storing the operating geolocation information in the memory of the RSU device 1310, for example as described with respect to operation 1115 of FIG. 11.

Next, at operation 1305, the RSU device 1310 submits a provisioning request for application certificates that include operating geolocation information to the SCMS host 1308. In some embodiments, as shown, the provisioning request in operation 1305 comes directly from the RSU device 1310, and may include a desired operating geolocation for the RSU device 1310, along with a tenant identifier (ID) as described previously with respect to FIG. 8.

In various embodiments, the RSU device 1310 may form the provisioning request using information from its enrollment certificate. In the V2X environment (e.g., as specified by CAMP) an enrollment certificate is required to contain the application permissions (identified by PSID values) and the allowed geo-region for each RSU and OBU. An RSU or OBU device can only obtain application certificates and/or pseudonym certificates that correspond to the PSID values contained in the enrollment certificate, in the conventional environment as specified by CAMP.

At operation 1307, after the RSU device 1310 sends a provisioning request to the SCMS host 1308 with an identifier for the virtual registration authority 1320, the SCMS host 1308 then parses the tenant ID (e.g., a UUID or other unique identifier for tenant A) from the request so that the request can be routed to the virtual registration authority 1320 that handles that tenant. In this way, the process 1300 can service multiple tenants with a single SCMS host 1308, and handle custom configurations. In the example of FIG. 13A, at operation 1307, the SCMS host 1308 parses the tenant ID for tenant A from the request. In certain implementations, the provisioning request includes metadata indicating the tenant ID for tenant A, where the tenant ID can be a hash, UUID, or other type of unique ID that does not reveal the identity of the tenant.

Then, at 1309, the SCMS host 1308 validates the tenant against an enrollment certificate authority to determine if a separate enrollment certificate authority exists for the tenant. For example, the SCMS host 1308 can perform a look up to verify that a specific enrollment certificate for the device 1310 is owned by or associated with a certain tenant (e.g., tenant A in the example of FIG. 13A). Therefore, a cryptographic validation can be made for these service calls to ensure they are authorized for the RSU device 1310.

In various implementations, the validation or authorization check performed in operation 1309 may involve the SCMS host 1308 decrypting and verifying the provisioning request, including signature verification, checking for revocation status of the RSU device 1310 that is the destination of the certificates using a list of unapproved devices (e.g., a blacklist), and determining whether the requestor (e.g., device 1310) is allowed to request certificates from the SCMS host 1308. For instance, operation 1309 may include determining whether a user from a manufacturer is an authorized user (e.g., part of a staff). In some implementations, the SCMS host 1308 may also determine at 1309 whether a computerized device (e.g., the RSU 1310) to receive certificates is approved for use. In some instances, a list of approved devices (e.g., a whitelist) may be provided by a regulator and used to make this determination.

If the tenant passes the validation or authorization checks, then at 1311 the SCMS host 1308 sends a general acknowledgment (ACK) message confirming the provisioning request has been received, which is received at 1312 by the RSU device 1310.

At 1311, the SCMS host 1308 verifies or determines that the desired operating geolocation is within, a subset of, or otherwise corresponds to, the allowed geo-region for the RSU device 1310, as described previously with respect to operation 1125 of FIG. 11.

At 1313, after the request for the certificates and the desired geolocation are validated, the SCMS host 1308 initiates a provisioning request that includes the tenant ID for tenant A. In the example of FIG. 13A, the tenant ID is embodied as a UUID. This starts the operations for generating the requested certificate(s), which will include the operating geolocation information.

In the example shown in FIG. 13A, at 1323, the SCMS host 1308 examines policy parameters for tenant A, and depending on the policy parameters, generates a request for the correct amount of geolocation-restricted application certificates from the pseudonym certificate authority 1340. In an example, operation 1323 may include the SCMS host 1308 using the parsed tenant ID from operation 1307 to determine what policy parameters to abide by for the particular application certificate request and using the operating geolocation from the request 1305 to specify the operating geolocation to include in the application certificates from the pseudonym certificate authority 1340.

At 1325, the virtual registration authority 1320 transmits a request for the application certificates to the pseudonym certificate authority 1340. This request may be sent as a batch of application certificate generation requests that are created by the virtual registration authority 1320.

At 1327, the request for the application certificates is received at the pseudonym certificate authority 1340. In response to receiving the request at 1327, the pseudonym certificate authority 1340 optionally uses information for tenant A to use a different certificate chain or key to sign the certificates. At 1327, the pseudonym certificate authority 1340 generates the requested geolocation-restricted application certificates and transmits the generated application certificates back to the virtual registration authority 1320. At 1329, the geolocation-restricted application certificates are received at the virtual registration authority 1320.

Next, as shown in FIG. 13B, at 1331, the RSU device 1310 may send a request to the SCMS host 1308 to download the batch of geolocation-restricted application certificates, for example as described previously with respect to FIG. 8B.

At operation 1333, the SCMS host 1308 parses the tenant ID from the batch download request. Then, at 1335, the SCMS host 1308 validates the tenant against the enrollment certificate authority to determine if a separate enrollment certificate authority exists for the tenant.

Next, at 1337, the SCMS host 1308 ensures that a policy for tenant A is enforced. Operation 1337 can include the SCMS host 1308 using the parsed tenant ID from operation 1333 to determine what policy parameters to abide by for the particular batch application certificate download request. For instance, 1337 may include retrieving local policy parameters for the RSU device 1310 from that device's LPF. After ensuring that the policy for tenant A is being enforced with respect to the requested batch of application certificates, control is passed to operation 1339.

At 1339, when the geolocation-restricted application certificates are ready, e.g., from the virtual registration authority 1320, the SCMS host 1308 transmits or returns the application certificates to the device 1310. At 1341, the device 1310 receives the geolocation-restricted application certificates. At this point, the device 1310 is provisioned with the geolocation-restricted application certificates and the device 1310 can use the application certificates.

In additional or alternative implementations, systems, devices, and processes similar to those described with respect to FIGS. 10-13 above can be used to provision certificates to other computerized devices, such as, for example, other V2X devices that need digital assets with current geographic operating restrictions.

In other additional or alternative implementations, systems, devices, and processes similar to those described with respect to FIGS. 10-13 above can be used to create, provision, and use a geographically restricted application certificate that includes multiple operating geolocations, such as an application certificate including the geographic coordinates of five different intersections or an application certificate including the specifications of 10 different geographic areas corresponding to 10 different stretches of roadway. In such implementations, the RSU device would operate properly at or in any of the multiple operating geolocations stored in the RSU's application certificate. In a use example for such implementations, a work crew that is planning to work at 10 different locations over a two week period may request and provision their RSU device with an application certificate containing those 10 different operating geolocations, which would reduce the need and frequency of re-provisioning the application certificate.

In some such implementations, the application certificate containing multiple operating geolocations may also include a time period (e.g. a day or a week) associated with each operating geolocation during which the RSU device operates properly at each of the operating geolocations. For example, the first operating geolocation may be valid for proper operation only on January 1, and the second operating geolocation may be valid for proper operation only during the period from January 2 through January 4, per the information in the application certificate.

In another similar additional or alternative implementation, the system may provision the RSU with, and the RSU may use, multiple application certificates, each of which contain only a single operating geolocation and a specific time period during which that certificate allows proper operation of the RSU. In an example of this variation, the first application certificate may be used by the RSU only on January 1 and be valid for proper operation on that day only at a first operating geolocation, while the second application certificate containing the second operating geolocation may be used by the RSU for proper operation only at a second operating geolocation during the period from January 2 through January 4. In this implementation, an RSU user can provision an RSU with the geo-restricted application certificates needed for each of several work site locations for the next several days (e.g., the next week or two weeks) in the future.

As described herein, various embodiments consistent with the invention solve the technical drawbacks of the current conventional provisioning systems and meet the technical requirements of the V2X environment. As described in the examples herein, various embodiments provide an extended SCMS 400 that can be used by multiple subscribers (e.g., tenants), that can provide unique configuration capabilities to each subscriber, and that can provide the necessary subscriber-unique updates to deployed V2X devices. Various embodiments consistent with the invention enable RSUs to be initially programmed/provisioned at the manufacturing site with geo-region information, and then after being shipped to the owner/operator, to be securely programmed or provisioned with the proper operational digital assets, such as application certificates having current application permissions and geographic restriction information, at the site of the owner/operator, which need not be a specialized site.

As described herein, various embodiments consistent with the invention enable a SCMS subscriber (e.g., a tenant who owns or uses an RSU) to request a new geolocation-restricted certificate(s) via the CMS Management Portal 402, secure email, the CAMP-defined end entity to RA communications (as modified as described in this document), or by REST API using the device's serial number and using a conventional internet-connected computer. The described extended SCMS 400 verifies or determines that the serial number of the RSU is known to the extended SCMS 400 from the initial manufacturing provisioning step (e.g., that the device is authorized), as the system acquired the serial number at the time of manufacture as part of our multi-step provisioning process described. Upon successful verification of the serial number, the SCMS verifies that the requested new geolocation for the RSU is within the allowed geo-region for the RSU (e.g., as set by the manufacturer at initial provisioning), and then issues to the RSU the requested application certificates having the requested new geolocation.

Some embodiments consistent with the invention enable an SCMS subscriber (e.g., tenant) to pre-register the necessary PSIDs (Provider Service Identifier) and the device serial numbers with which they are to be associated in the extended SCMS 400 via the CMS Management Portal 402, secure email, or REST API. When the SCMS 400 receives a request for application certificates from the RSU (e.g., at 1120, 1205), it will use the enrollment certificate to identify the associated serial number of the device. The SCMS 400 will then use the serial number to identify the correct PSID and other data, such as geo-region information, and then the SCMS 400 will create the appropriately configured application certificates and return them to the requesting RSU.

Although the foregoing examples use specific examples of computerized devices, such a OBUs, ECUs, and RSUs, for clarity of explanation, the invention is not limited to those specific examples. In addition to the V2X devices used herein to illustrate these new capabilities, devices and methods, they may also be applied to any IoT devices, including those that need geographic operating restrictions. Thus, various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

The various operations of the applications described herein may be performed, at least partially, by one or more VMs. In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example implementations, the processors or processor-implemented modules may be located in a single geographic location (e.g., within an office environment, a manufacturing environment, or a server farm). In other example implementations, the processors or processor-implemented modules may be distributed across a number of geographic locations.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A method, implemented by an enhanced security credential management system (SCMS) host, for securely provisioning a device that includes an enrollment certificate and one or more application certificates, wherein the device is geographically restricted according to both the enrollment certificate and the one or more application certificates, the method comprising:
   providing the enrollment certificate to the device, wherein the enrollment certificate specifies a geo-region for the device;
   receiving a request for an application certificate for the device;
   generating local policy data for the application certificate, the local policy data indicating tenant-specific data corresponding to the device, the tenant-specific data comprising application permissions, a duration of validity of the application certificate, and an overlap time period for the application certificate with a second application certificate;
   determining, in response to the request, an operating geolocation for the device;
   verifying that the operating geolocation is within the geo-region;
   generating the application certificate; and
   providing, in response to the request, the application certificate and the local policy data to the device, whereby the device is geographically restricted according to the operating geolocation and a subsequent geolocation of the application certificate.

2. The method according to claim 1, wherein
   the request includes the operating geolocation for the device; and
   wherein determining, in response to the request, an operating geolocation for the device comprises obtaining the operating geolocation from the request.

3. The method according to claim 2, wherein the request is received from the device.

4. The method according to claim 3, whereby the device is configured with the operating geolocation, and the device includes the operating geolocation in the request.

5. The method according to claim 1, further comprising:
   prior to receiving the request for the application certificate, receiving a request to store the operating geolocation for the device, wherein the request includes the operating geolocation for the device; and
   storing, in response to the request, the operating geolocation for the device; and
   wherein determining, in response to the request, an operating geolocation for the device comprises obtaining the operating geolocation that was stored.

6. The method according to claim 5, wherein the request to store the operating geolocation is received from a user of the device.

7. The method according to claim 1, wherein the geo-region is a country or a state.

8. The method of claim 1, wherein the application certificate comprises two or more application certificates.

9. A non-transitory computer readable media containing instructions that, when executed by one or more processors, perform a method for securely provisioning a device that includes an enrollment certificate and one or more application certificates, wherein the device is geographically restricted according to the one or more application certificates, the method comprising:
   providing the enrollment certificate to the device, wherein the enrollment certificate specifies a geo-region for the device;
   receiving a request for an application certificate for the device;
   generating local policy data for the application certificate, the local policy data indicating tenant-specific data corresponding to the device, the tenant-specific data comprising application permissions, a duration of validity of the application certificate, and an overlap time period for the application certificate with a second application certificate;
   determining, in response to the request, an operating geolocation for the device;
   verifying that the operating geolocation is within the geo-region; generating the application certificate; and
   providing, in response to the request, the application certificate and the local policy data to the device, whereby the device is geographically restricted according to the operating geolocation and a subsequent geolocation of the application certificate.

10. The non-transitory computer readable media according to claim 9, wherein the request includes the operating geolocation for the device; and
   wherein determining, in response to the request, an operating geolocation for the device comprises obtaining the operating geolocation from the request.

11. The non-transitory computer readable media according to claim 10, wherein the request is received from the device.

12. The non-transitory computer readable media according to claim 11, wherein the device is configured with the operating geolocation, and the device includes the operating geolocation in the request.

13. The non-transitory computer readable media according to claim 9, wherein the method further comprises:
   prior to receiving the request for the application certificate, receiving a request to store the operating geolocation for the device, wherein the request includes the operating geolocation for the device; and
   storing, in response to the request, the operating geolocation for the device; and
   wherein determining, in response to the request, an operating geolocation for the device comprises obtaining the operating geolocation that was stored.

14. The non-transitory computer readable media according to claim 13, wherein the request to store the operating geolocation is received from a user of the device.

15. The non-transitory computer readable media according to claim 9, wherein the geo-region is a country or a state.

16. A system for securely provisioning a device that includes an enrollment certificate and one or more application certificates, wherein the device is geographically restricted according to the one or more application certificates, the system comprising:
   one or more memories containing instructions;
   one or more processors, operatively coupled to the one or more memories, that execute the instructions to perform operations comprising:
      providing the enrollment certificate to the device, wherein the enrollment certificate specifies a geo-region for the device;
      receiving a request for an application certificate for the device;
      generating local policy data for the application certificate, the local policy data indicating tenant-specific data corresponding to the device, the tenant-specific data comprising application permissions, a duration of validity of the application certificate, and an overlap time period for the application certificate with a second application certificate;
      determining, in response to the request, an operating geolocation for the device;
      verifying that the operating geolocation is within the geo-region;
      generating the application certificate; and
      providing, in response to the request, the application certificate and the local policy data to the device, whereby the device is geographically restricted according to the operating geolocation and a subsequent geolocation of the application certificate.

17. The system according to claim 16, wherein
   the request includes the operating geolocation for the device; and
   wherein determining, in response to the request, an operating geolocation for the device comprises obtaining the operating geolocation from the request.

18. The system according to claim 17, wherein the request is received from the device.

19. The system according to claim 18, whereby the device is configured with the operating geolocation, and the device includes the operating geolocation in the request.

20. The system according to claim 16, wherein the operations further comprise:
   prior to receiving the request for the application certificate, receiving a request to store the operating geolocation for the device, wherein the request includes the operating geolocation for the device; and
   storing, in response to the request, the operating geolocation for the device; and
   wherein determining, in response to the request, an operating geolocation for the device comprises obtaining the operating geolocation that was stored.

21. The system according to claim 20, wherein the request to store the operating geolocation is received from a user of the device.

22. The system of claim 16, wherein the one or more processors, operatively coupled to the one or more memories, execute the instructions to perform operations further comprising:
   modifying, after the device is deployed, the local policy data; and
   transmitting the modified local policy data to the device.

23. A system for securely provisioning a device that includes an enrollment certificate and an application certificate, wherein the device is geographically restricted according to the application certificate, the system comprising:
   one or more memories containing instructions;
   one or more processors, operatively coupled to the one or more memories, that execute the instructions to perform operations comprising:
      providing the enrollment certificate to the device, wherein the enrollment certificate specifies a geo-region for the device;
      receiving a request for the application certificate for the device;

generating local policy data for the application certificate, the local policy data indicating tenant-specific data corresponding to the device, the tenant-specific data comprising application permissions, a duration of validity of the application certificate, and an overlap time period for the application certificate with a second application certificate;

determining, in response to the request, a present operating geolocation for the device;

verifying that the present operating geolocation is within the geo-region; generating the application certificate based on the local policy data; and providing, in response to the request, the application certificate and the local policy data to the device, whereby the device is geographically restricted according to a first operating geolocation area for a first period of time and a second operating geolocation area for a second period of time.

* * * * *